Figure 1:
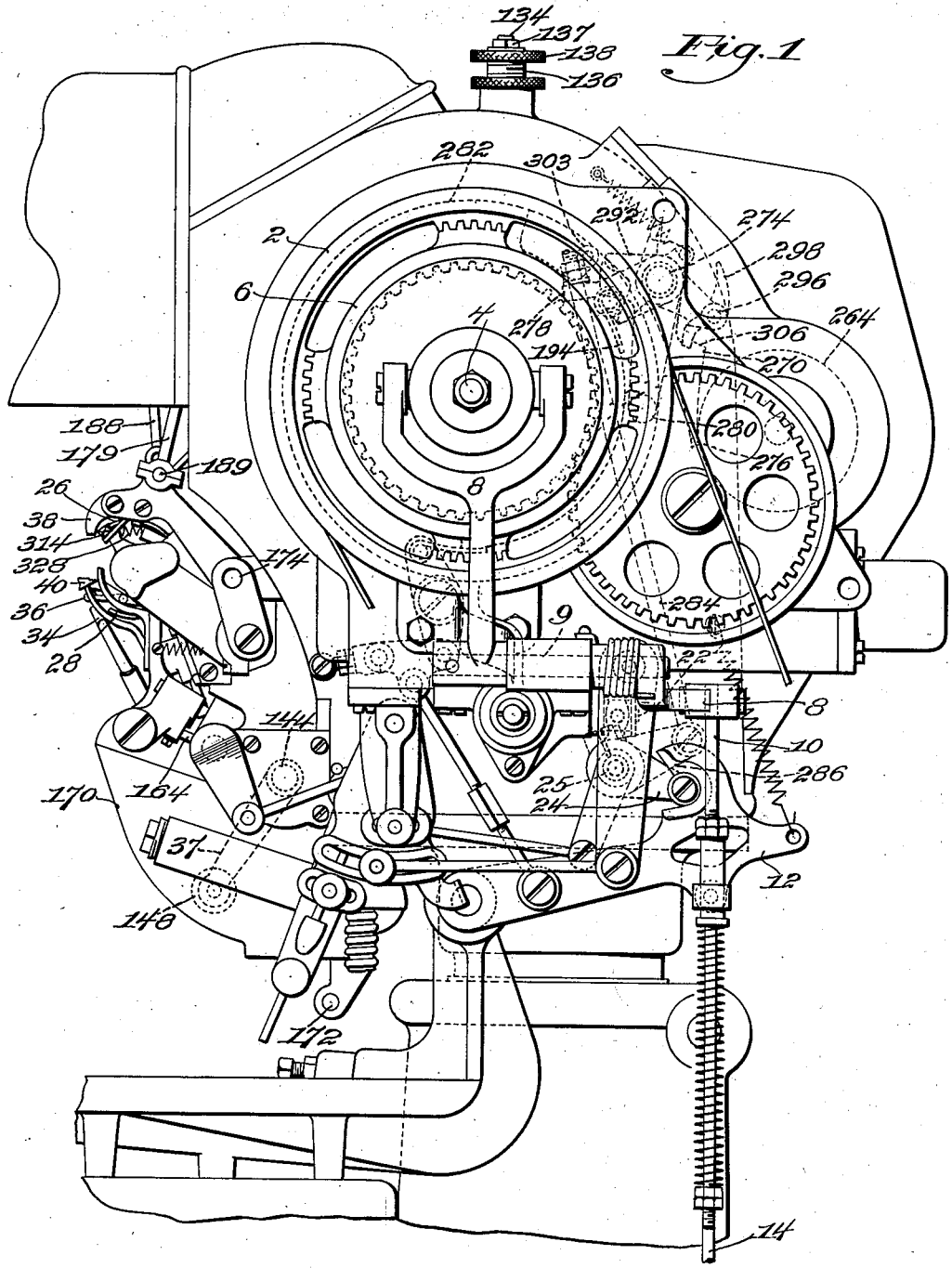

June 25, 1940.　　　O. R. HAAS　　　2,205,383
SEWING MACHINE
Filed Dec. 31, 1936　　　17 Sheets-Sheet 1

Witness
Jas. J. Maloney

Inventor
Otto R. Haas
by Fish Hildreth
Cary & Jenney Attys

June 25, 1940.  O. R. HAAS  2,205,383
SEWING MACHINE
Filed Dec. 31, 1936   17 Sheets-Sheet 7

Witness
Jas. J. Maloney

Inventor
Otto R. Haas
by Fish, Hildreth,
Cary & Jenney
Attys.

June 25, 1940.　　　O. R. HAAS　　　2,205,383
SEWING MACHINE
Filed Dec. 31, 1936　　　17 Sheets-Sheet 12

Witness
Jas. J. Maloney

Inventor
Otto R. Haas
by Fish Hildreth
Cary & Jenney Attys.

June 25, 1940.   O. R. HAAS   2,205,383
SEWING MACHINE
Filed Dec. 31, 1936    17 Sheets-Sheet 13
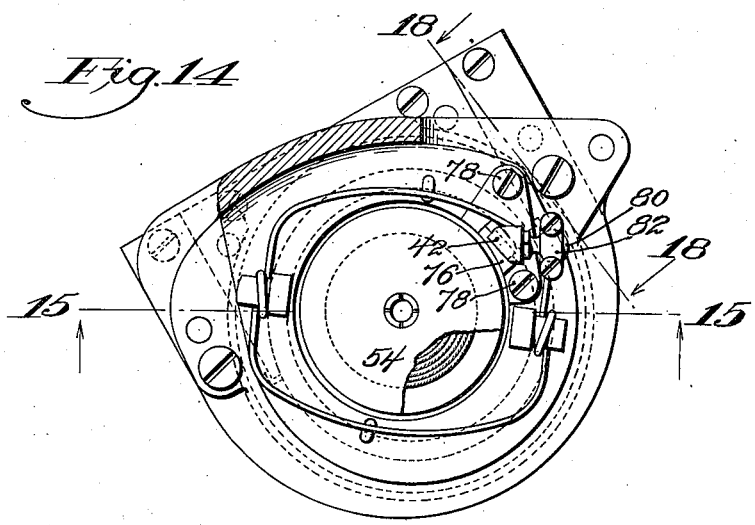
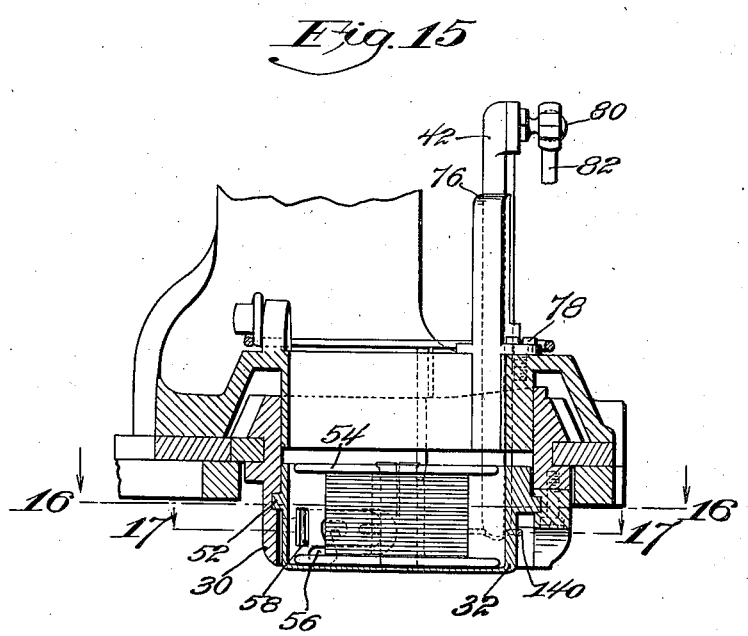

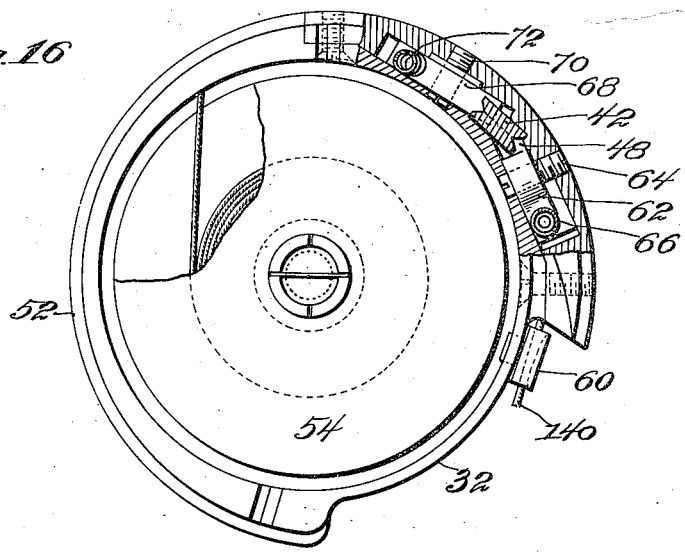
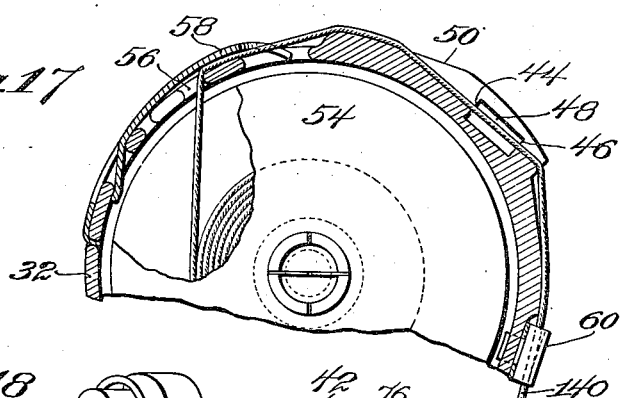
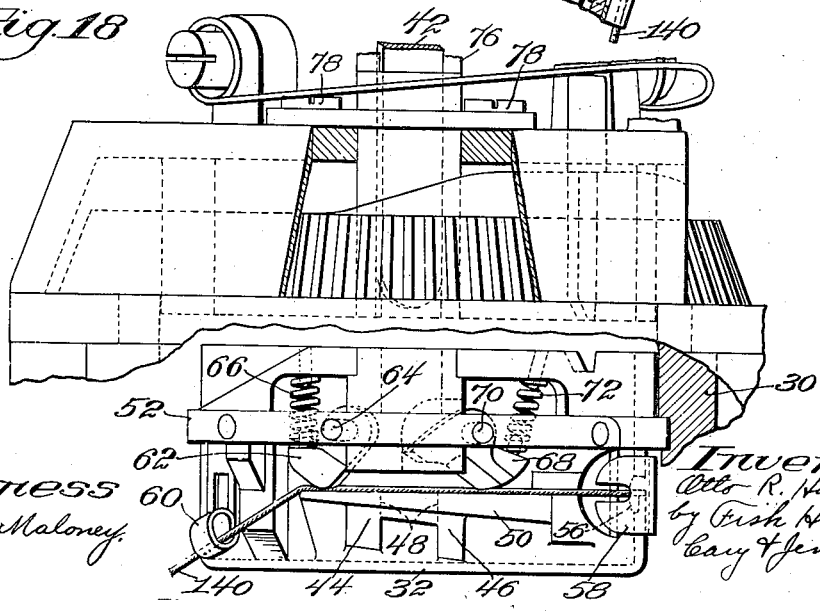

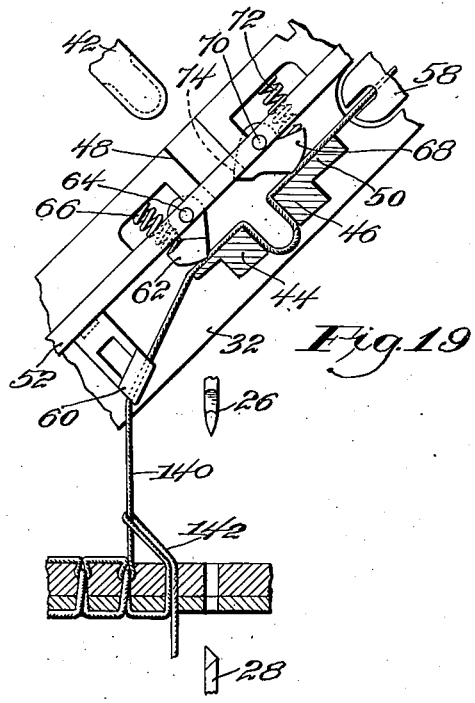
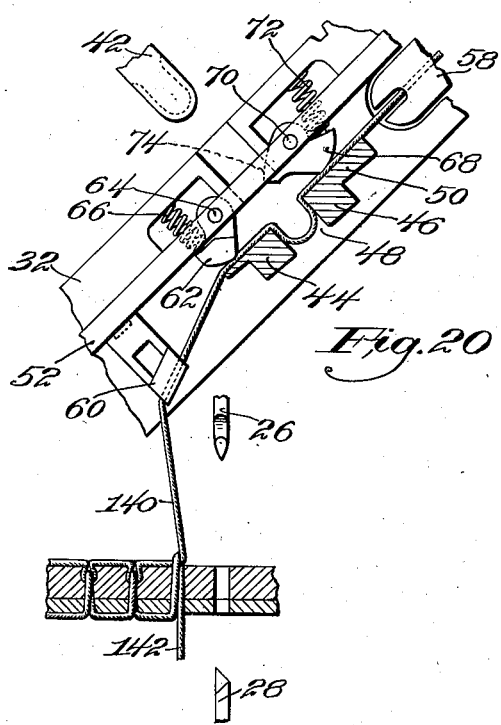
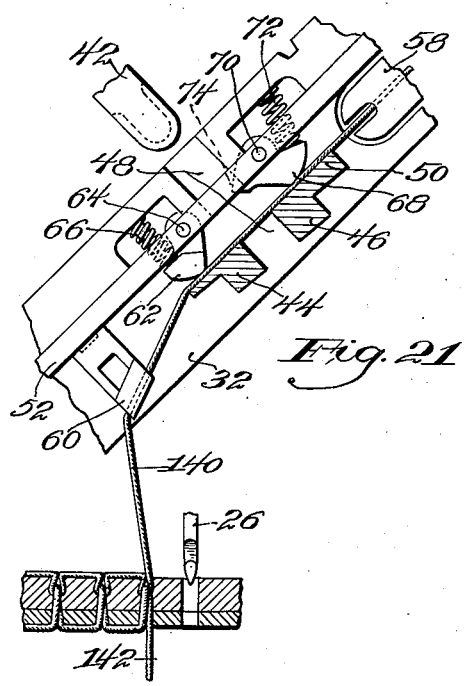
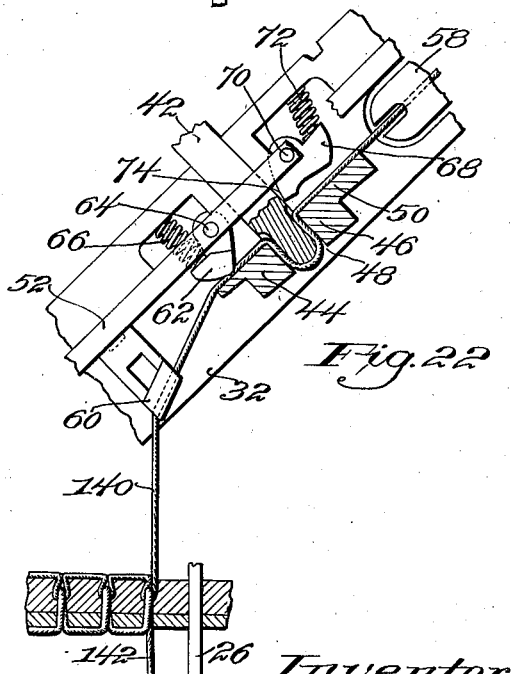

June 25, 1940.　　　　O. R. HAAS　　　　2,205,383
SEWING MACHINE
Filed Dec. 31, 1936　　　　17 Sheets-Sheet 16
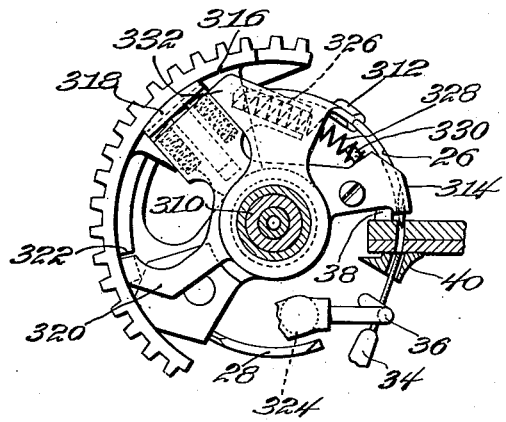
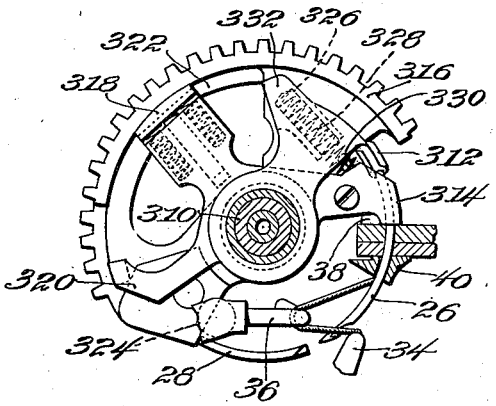
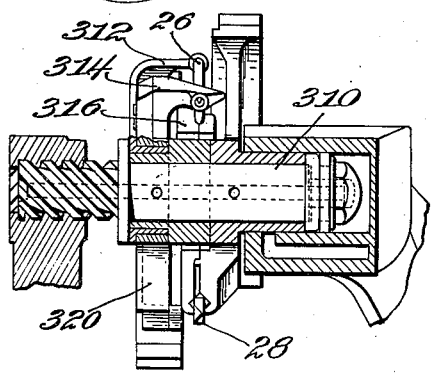
Witness
Jas. J. Maloney.
Inventor
Otto R. Haas
by Fish Hildreth
Cary & Jenney Attys

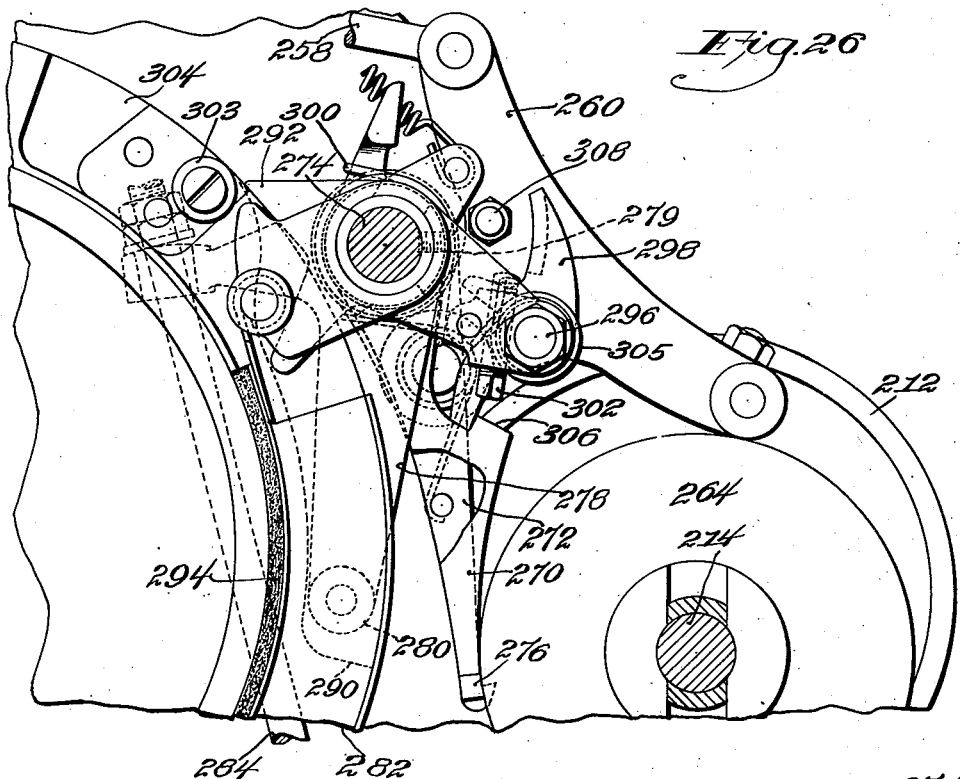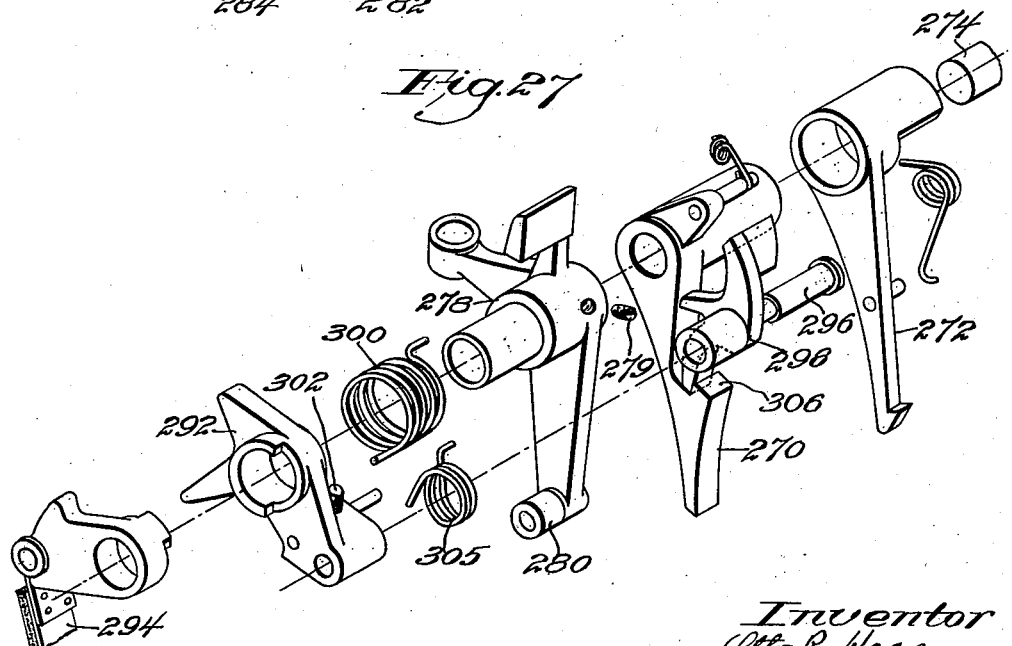

Patented June 25, 1940

2,205,383

UNITED STATES PATENT OFFICE 2,205,383

SEWING MACHINE

Otto R. Haas, North Beverly, Mass., assignor to United Shoe Machinery Corporation, Borough of Flemington, N. J., a corporation of New Jersey Application December 31, 1936, Serial No. 118,622

16 Claims. (Cl. 112—58)

The present invention relates to wax thread shoe sewing machines, and more particularly to a lockstitch machine of the type illustrated and described in the present inventor's U. S. Patent No. 2,148,197 of Feb. 21, 1939, which employs a hook needle and a take-up to draw loops of needle thread through the work, and a loop taker in the form of a shuttle to pass a locking thread through the loops of needle thread, which loop taker is necessarily located on the same side of the work as the needle, and at the opposite side of the work from the take-up.

The object of the invention is generally to provide a wax thread lockstitch shoe sewing machine of improved construction and mode of operation which will operate smoothly and accurately at speeds higher than those attained with any consistent degree of success in previous machines. More definite objects of the invention are to provide a lockstitch sewing machine, which will cause the stitches of a seam to be set with exact uniformity of tension and location in the work at high speeds, and which will form a strong finished seam more quickly and effectively than heretofore without requiring the exercise of unusual skill or ability on the part of the operator.

In a hook needle lockstitch sewing machine, after each loop of needle thread is drawn from the shuttle, there is no means of guiding the movement of the loop towards the work except for its loose surrounding relation with the locking thread leading from the previous stitch. Consequently, the needle loop is free to whip in all directions and, even when operating at comparatively low speeds, this whipping action becomes very violent, so that there is considerable sliding and wrapping of the needle thread about the locking thread. So long, however, as the sewing speed remains below the point where the needle loop can slide freely to a definite position along the locking thread before pulling the locking thread into the work, succeeding stitches may be formed with a fair degree of uniformity in location of the points of engagement between the threads and may thereafter be set with correct tension.

In certain lockstitch sewing machines, the locking thread is kept tight as the needle loop is pulled towards the work and the required amounts of locking thread and needle thread are drawn off for each stitch just as the stitch is set by maintaining a relative balance in the tension devices which act on the respective threads. In this type of machine it has been found that careful and frequent adjustments are required to secure an effective balance in the tension devices, and that the balance is subject to momentary changes in speed in the machine.

In order to avoid the difficulties met in balancing the tensions on the needle and locking threads, provision is made in the type of machine illustrated and described in the patent referred to for drawing off measured amounts of locking thread for each stitch. No attempt is made to balance the tensions in this type of machine, but the locking thread tension is made the heavier so as to reduce the tendency to draw additional locking thread before setting a stitch. After the measured amount of locking thread is drawn off, the stitches are set by the needle thread which acts to pull the locking thread into the work. With this arrangement for handling the sewing threads, proper tension adjustments are not only more easily obtained but are required less frequently than with the use of balanced tensions.

When the speed of sewing in a lockstitch machine is increased above that employed in present practice, a point is soon reached, particularly in the latter type of machine referred to, where the needle loop will no longer slide with certainty to a definite point along the locking thread before pulling the locking thread into the work. The looseness of the locking thread caused by giving up the amount of thread measured for each stitch then aggravates the whipping action of the needle loop so that it is impossible to cause the threads to come into engagement at a definite point before being pulled into the work. As a result, the locking thread may be brought laterally against the work by the needle loop with the locking thread loose at one side the point of engagement with the needle loop and tight at the other side. The needle loop, upon being tightened about the locking thread, acts to grip the locking thread at this point against the work and the frictional resistance offered by the work is then added to the sliding resistance of one thread on the other during the final setting of the stitch.

With a fixed tension on the needle thread, each stitch will be set at a location in the work where the total resistance equals the fixed tension. After a resistance equalling the needle thread tension is reached, the needle thread will be drawn by the take-up from the supply until the take-up stroke is completed. Due to one needle loop gripping the locking thread against the work at one distance and another loop gripping the locking thread at a greater distance from the previous stitch, successive stitches may be set in the work at different depths or with different degrees of tightness. The advantage gained, therefore, in drawing a measured amount of thread from the thread case for high speed sewing may be more than offset by the irregular manner in which successive needle loops are brought into definite engagement with and tightened against the locking thread.

In order to enable a measured amount of locking thread to be provided for each stitch without encountering the difficulties referred to, a feature of the present invention contemplates the provision in a hook needle lockstitch sewing machine having a loop taker, a thread supply case and a take-up, of means for drawing off from the supply a measured amount of locking thread and thereafter holding the measured amount of locking thread yieldingly from movement towards the work to cause each needle loop, as it is tightened by the take-up, to engage a portion of the locking thread not supported by the work or by other means. By causing the needle loop to be tightened against the locking thread along an unsupported portion, the needle loop is free to slide to a definite position at a uniform distance from the previous stitch. The advantage gained by providing a measured amount of locking thread for each stitch, in the machine of the present invention therefore, is not offset by irregular engagement of the threads in forming the stitch.

In the illustrated form of this feature of the invention, the locking thread is drawn off from the supply and is held yieldingly from movement towards the work by separate devices acting independently of each other, the measurement being effected by deflecting the locking thread between the supply and the work, and the measured amount being held from movement towards the work by a yielding member on the thread case. As hereinafter described, the yielding member acts as a gripping jaw against a jaw on the thread case to prevent pulling the locking thread backwardly from the previous stitch in the work as the deflecting means draws off each measured amount from the supply.

Other features of the invention relate to a novel and improved thread cutter, a novel and improved needle guide, and certain novel and improved constructions and arrangements of parts as hereinafter described in the following detailed specification, taken in connection with the accompanying drawings, and more particularly pointed out in the appended claims.

Figure 2:
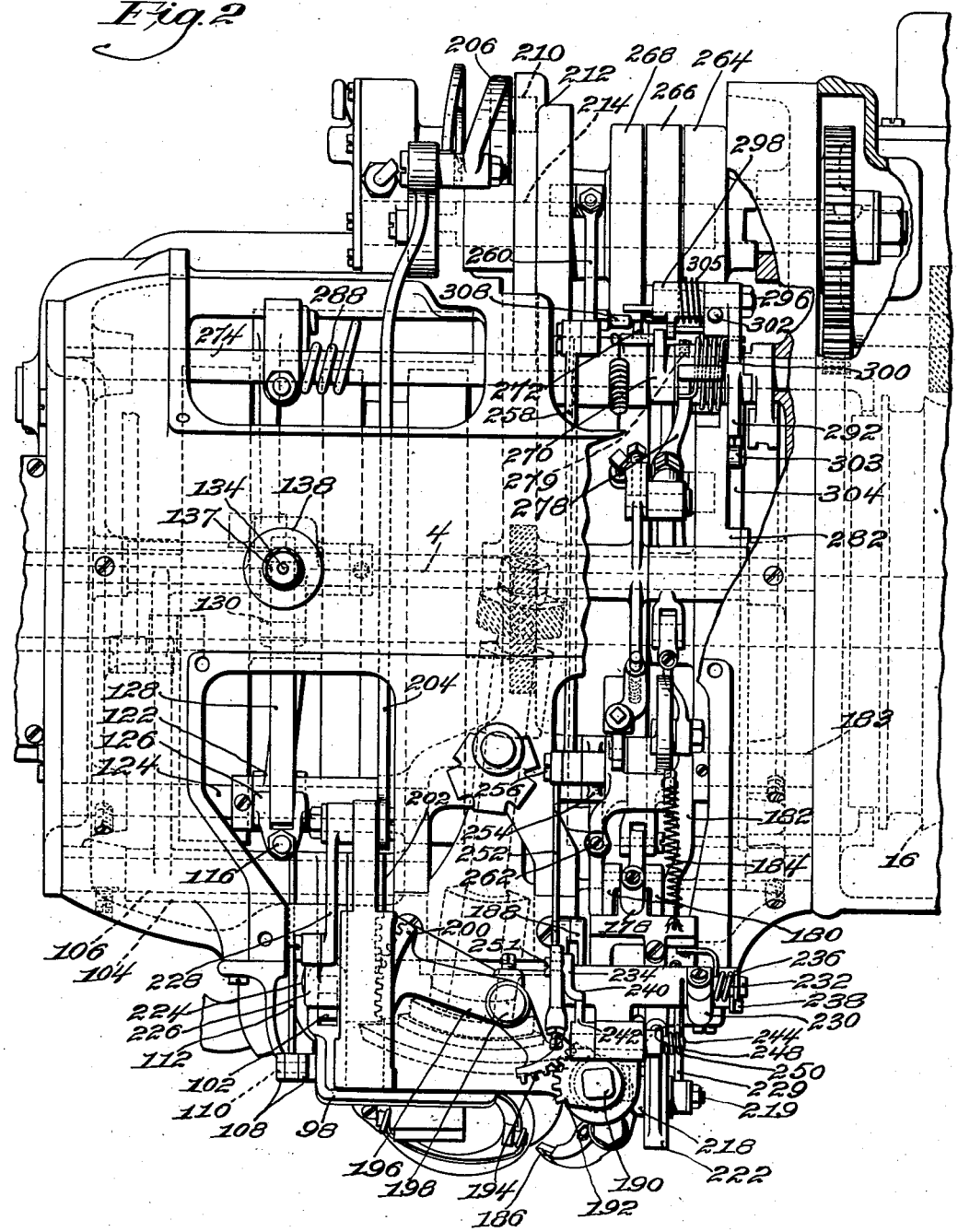
Figure 3:
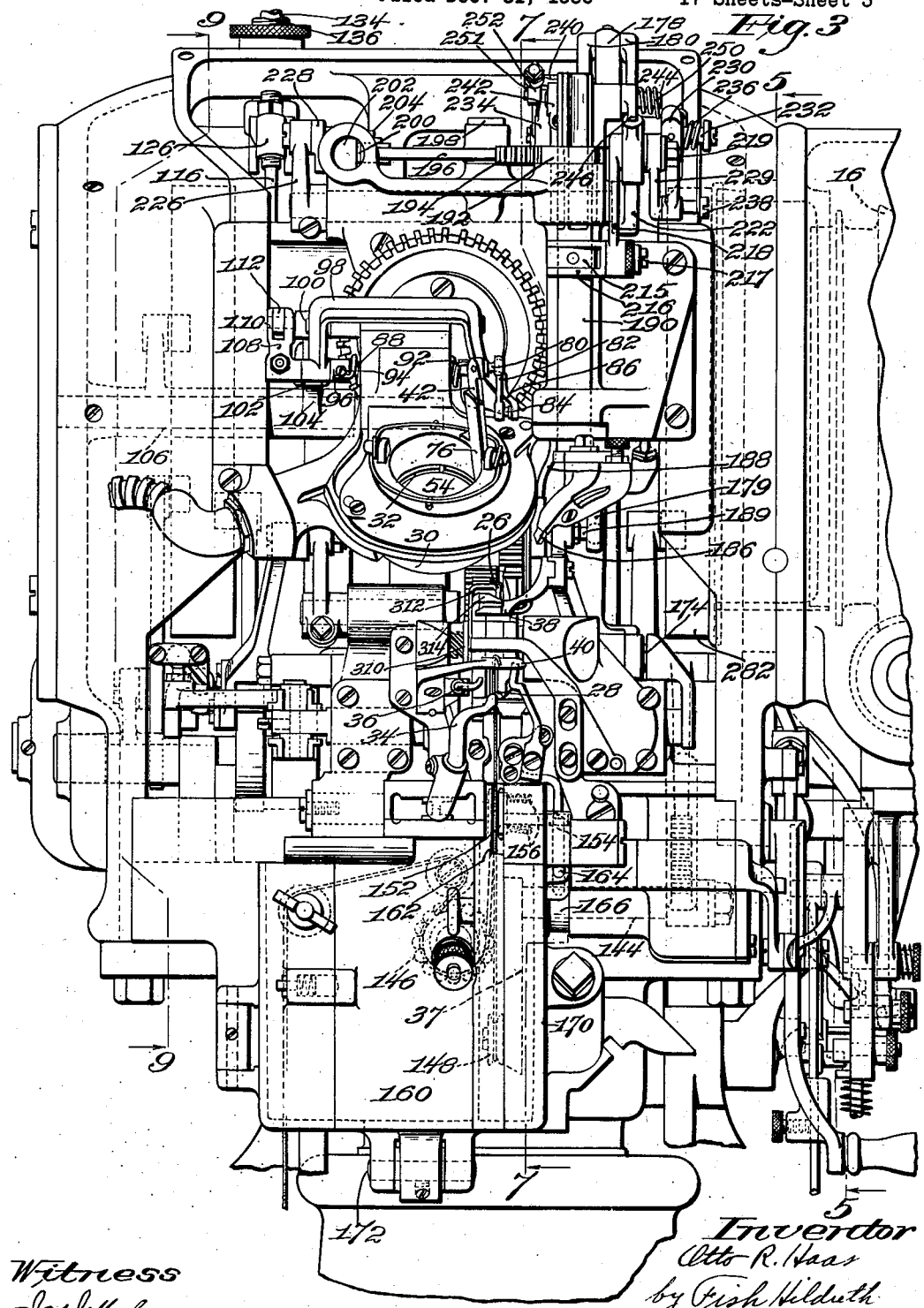
Figure 4:
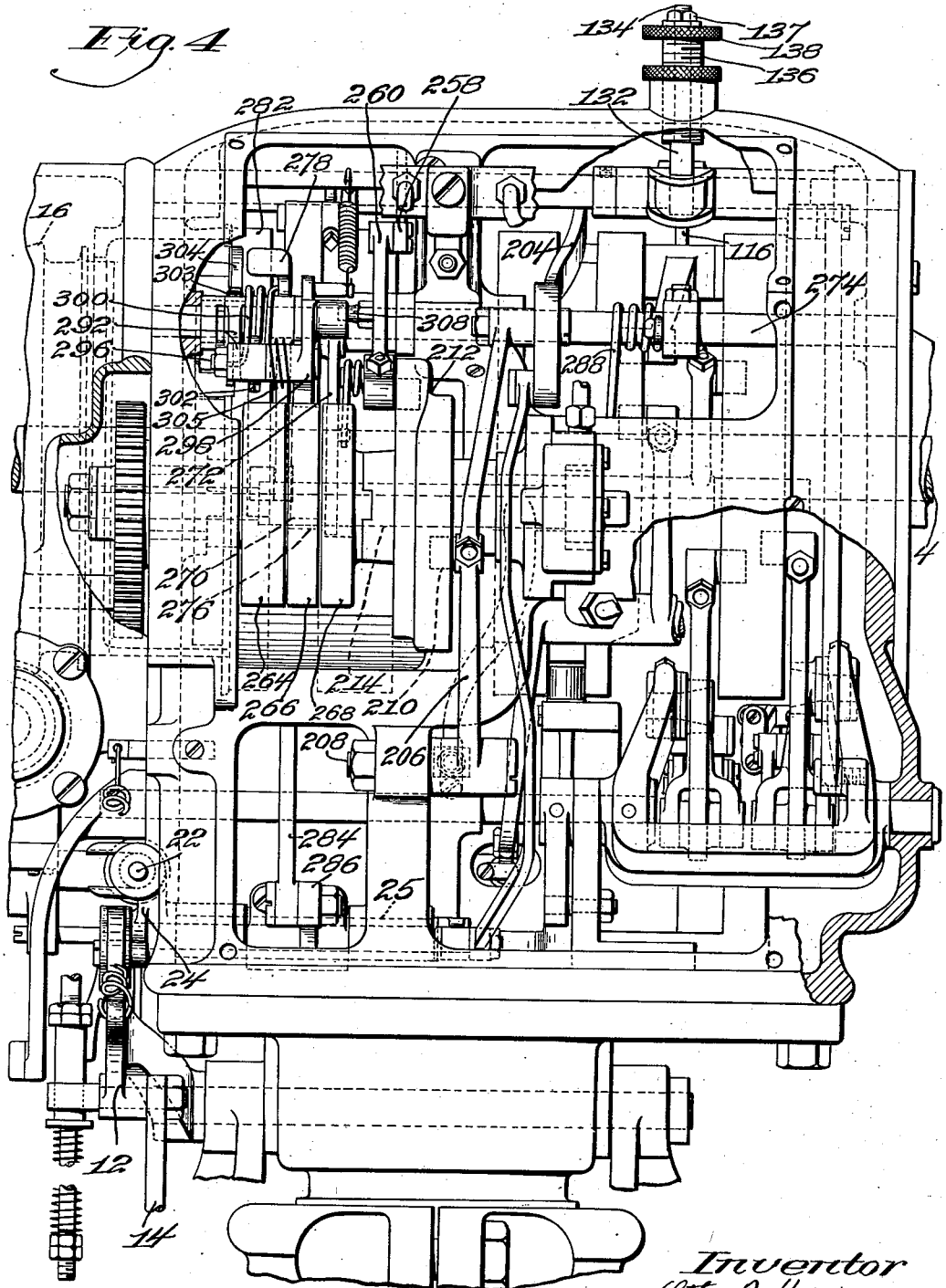
Figure 5:
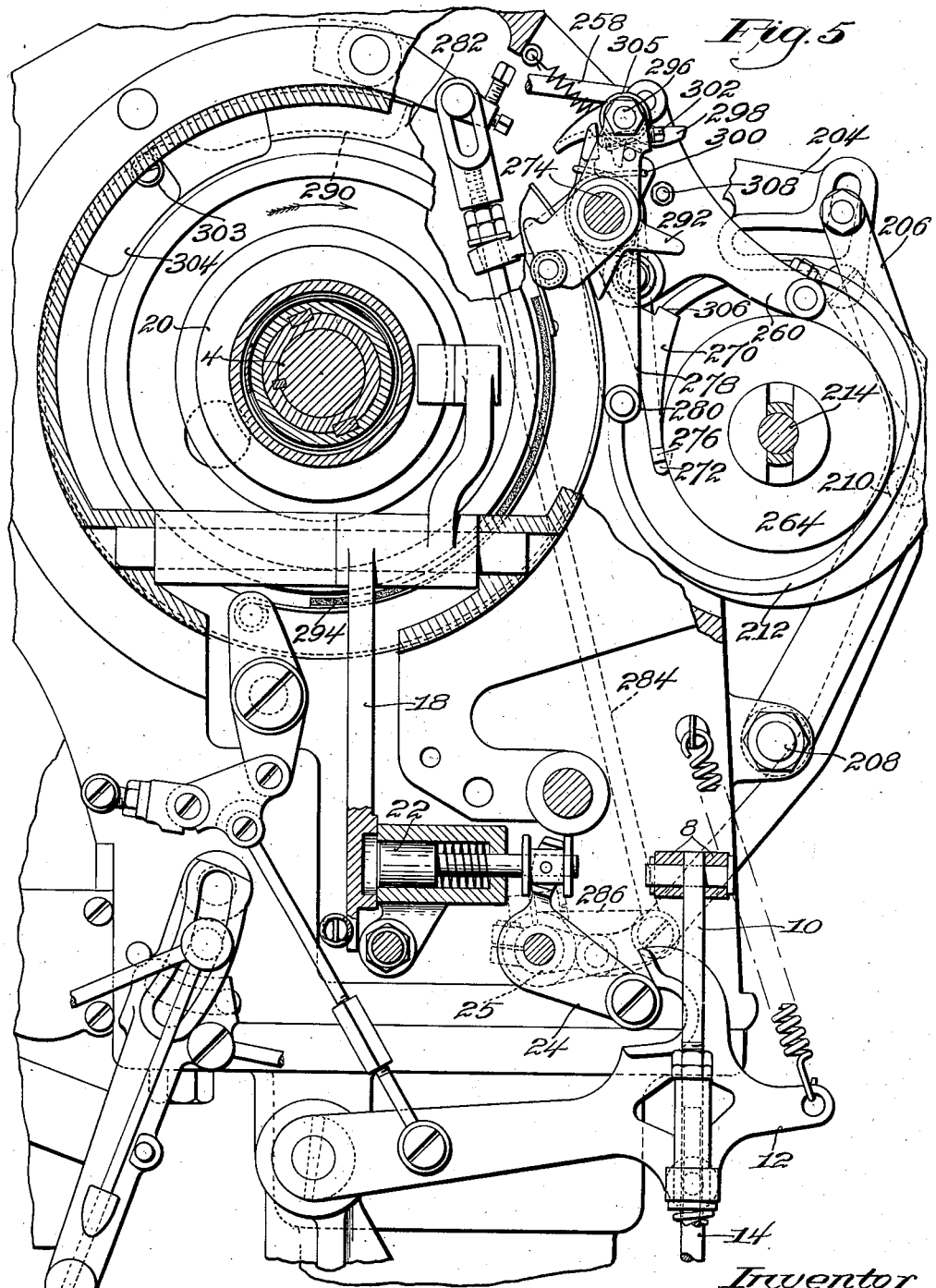
Figure 6:
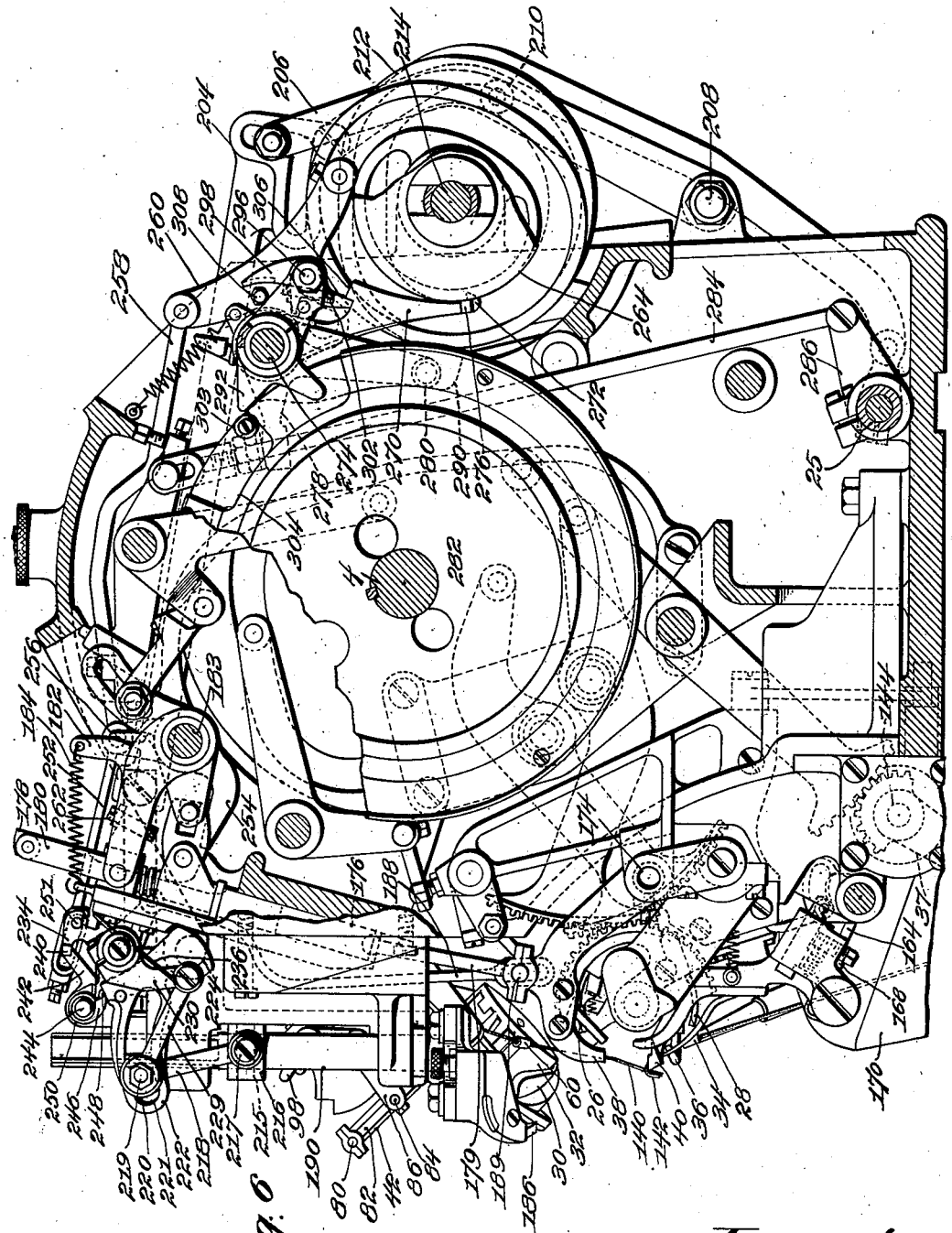
Figure 7:
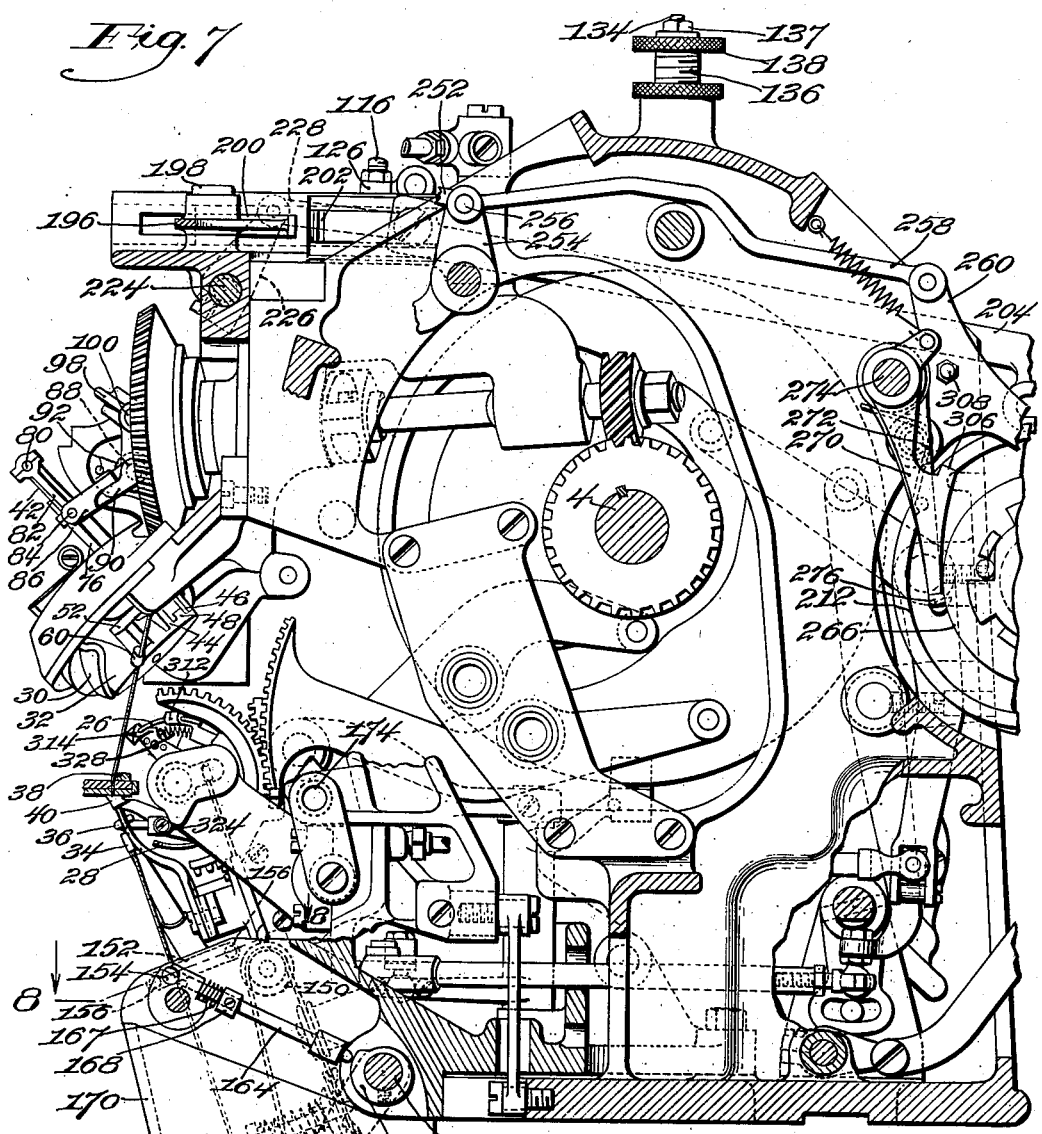
Figure 8:
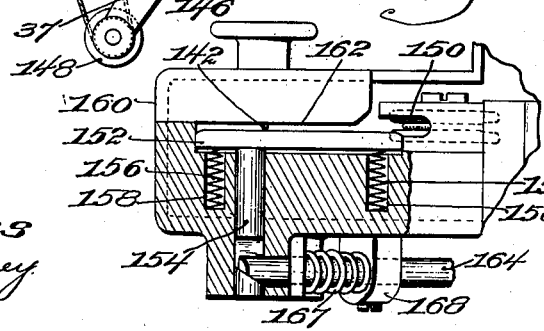
Figure 9:
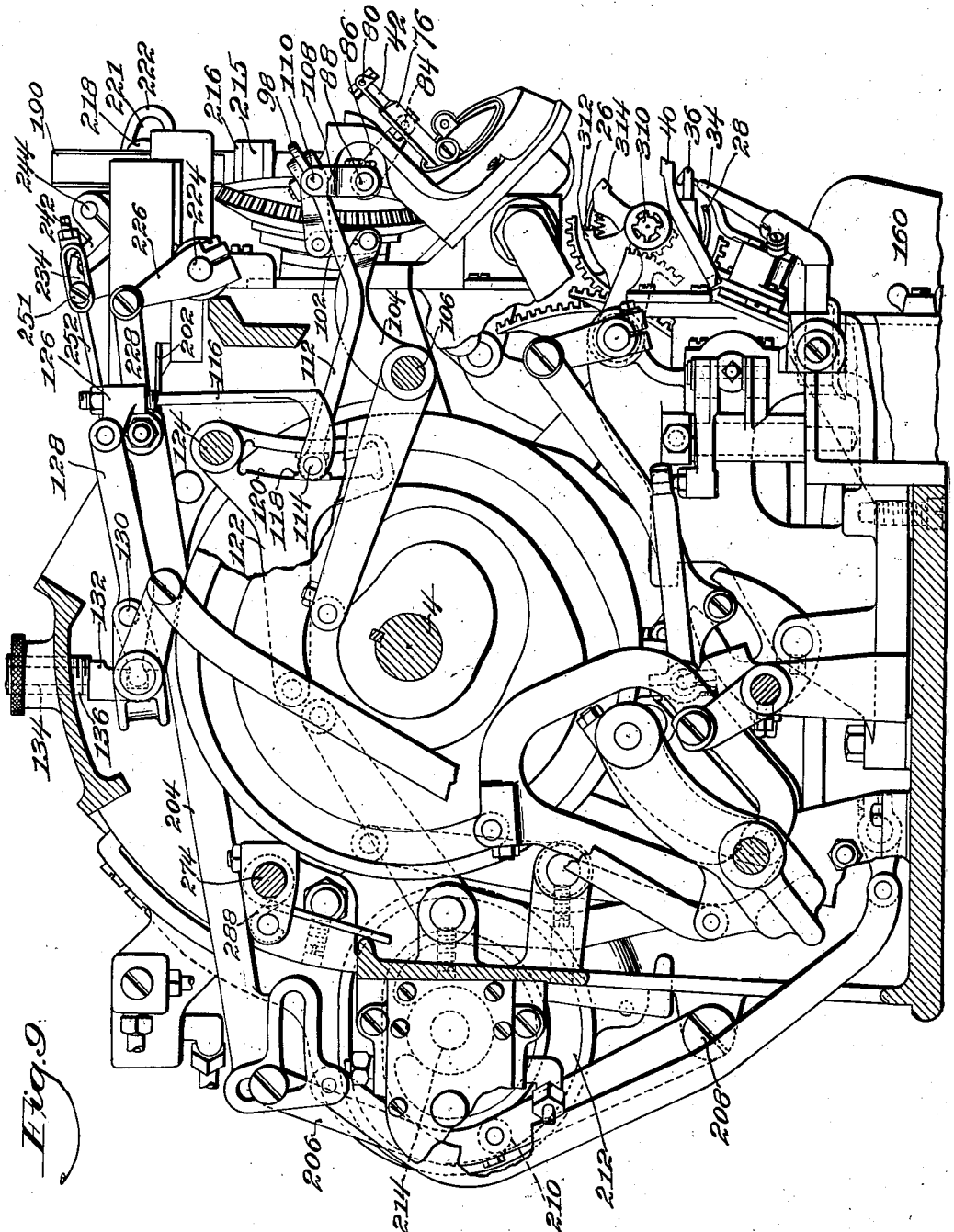
Figure 10:
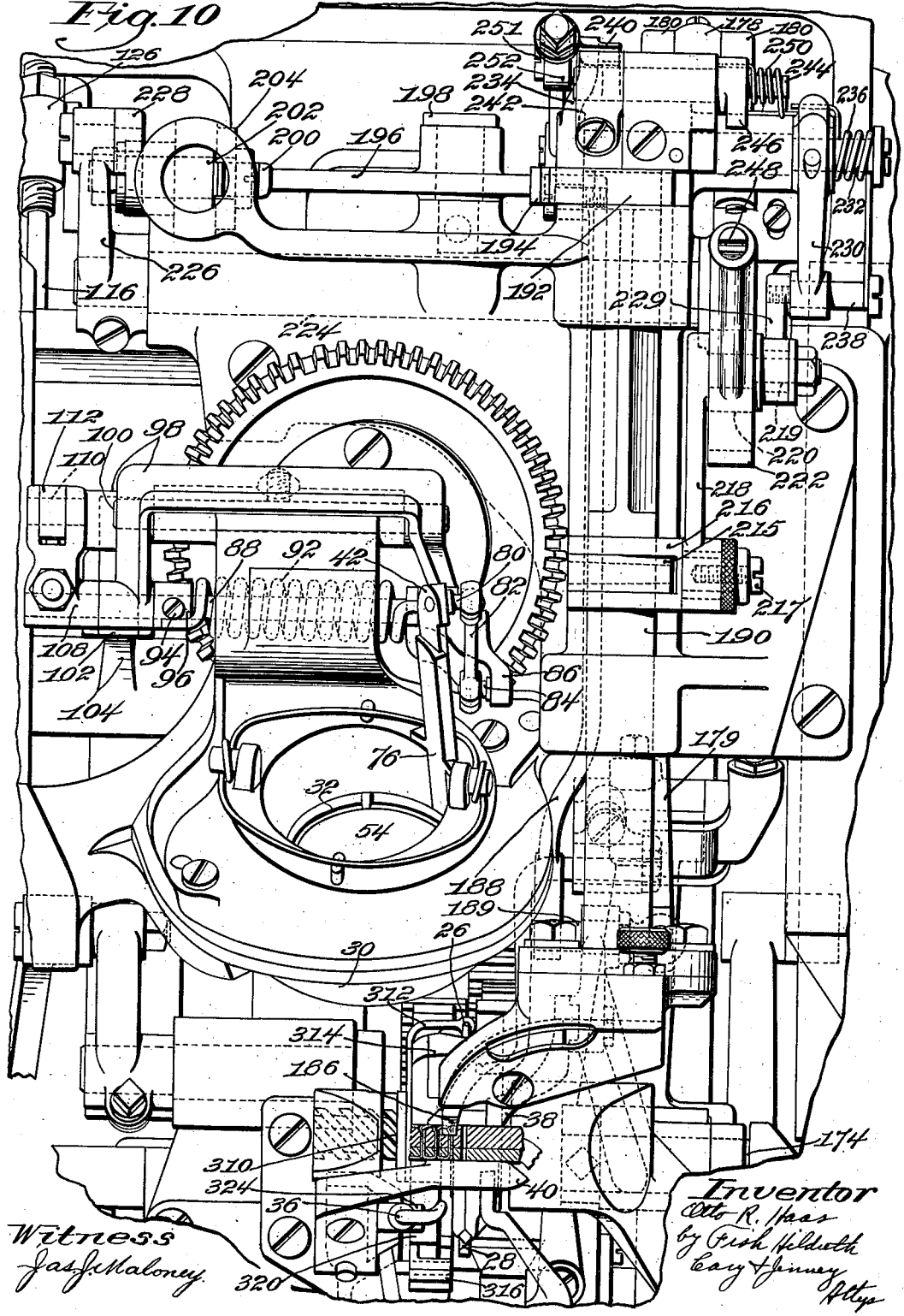
Figure 11:
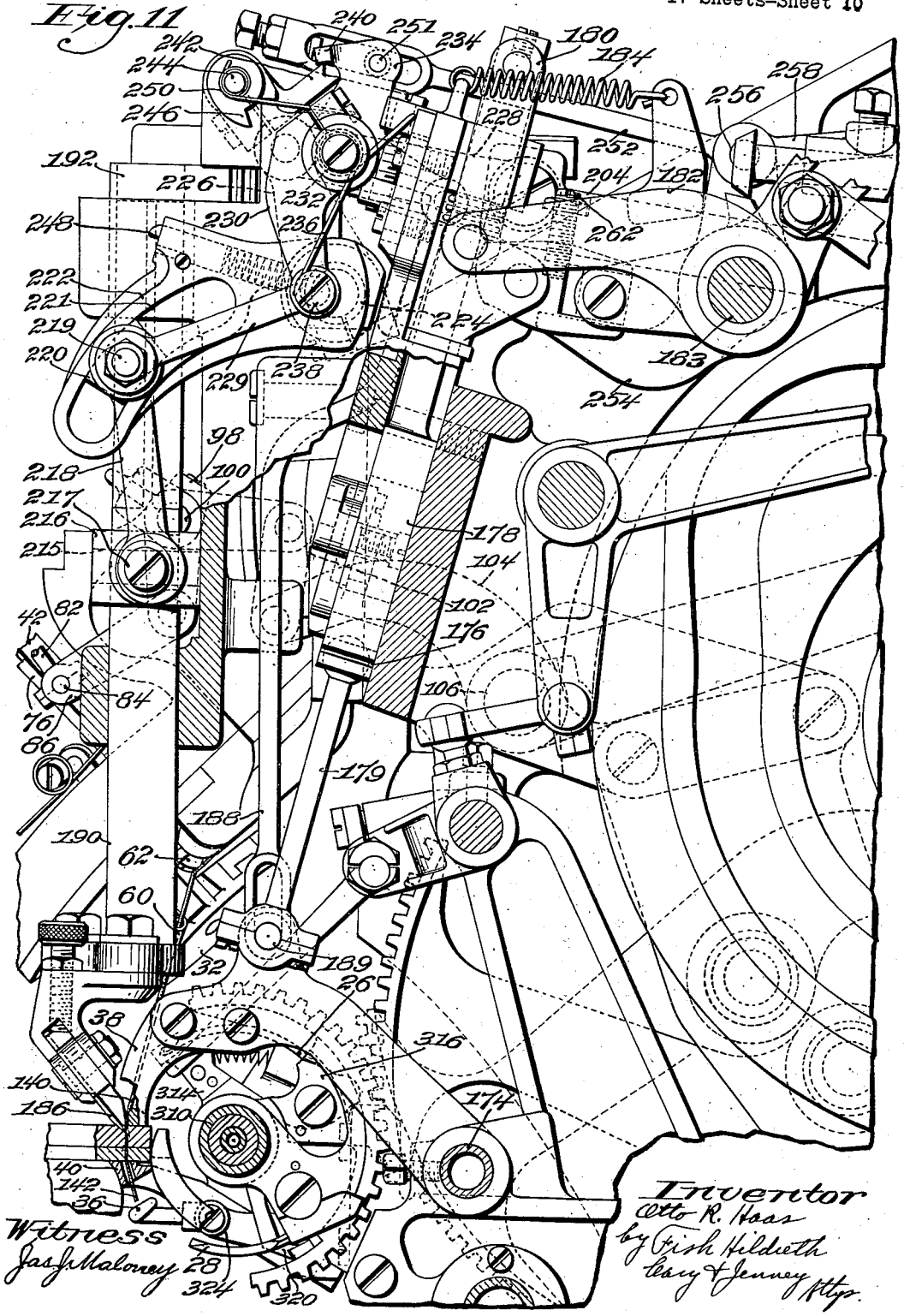
Figure 12:
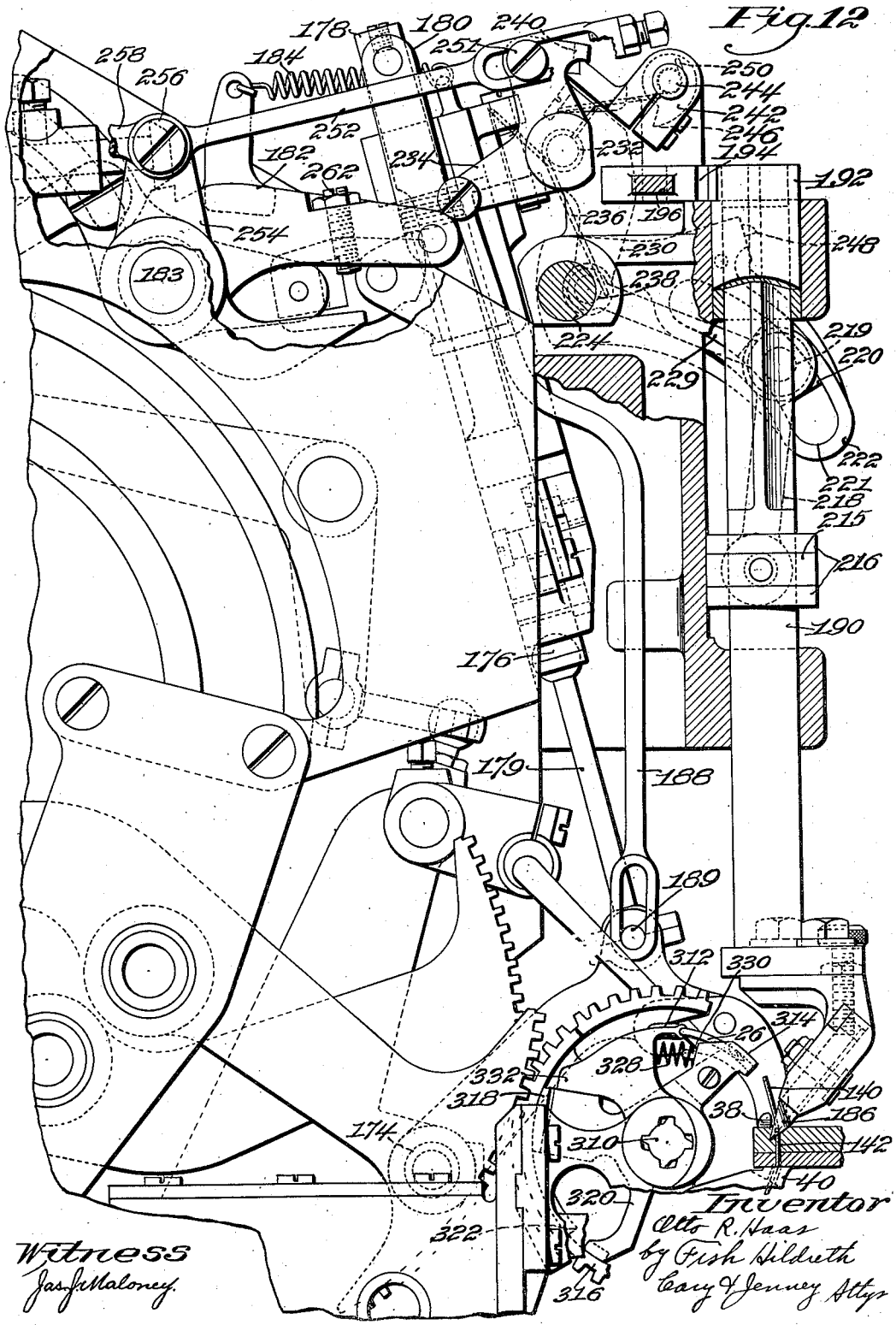
Figure 13:
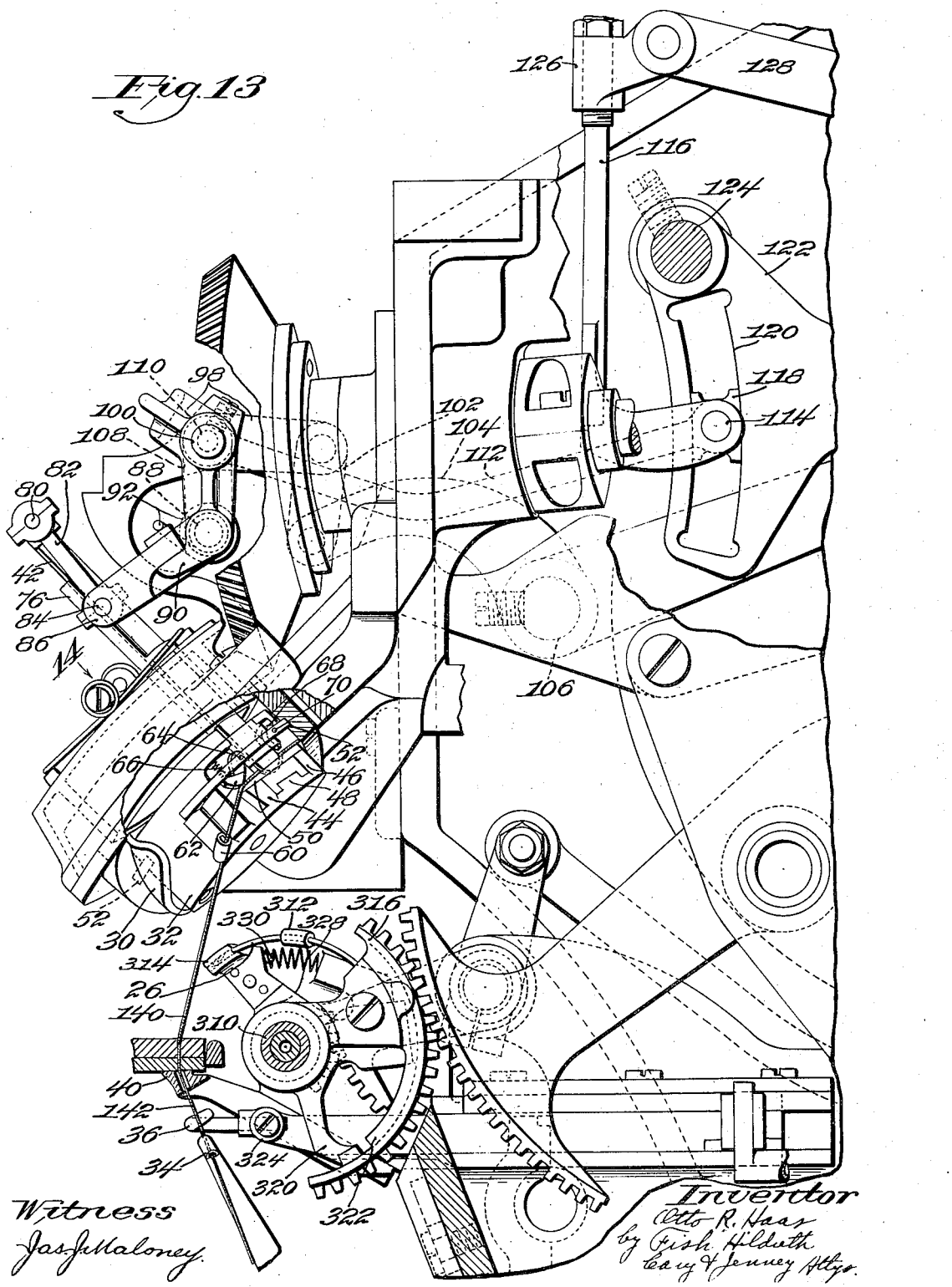

In the drawings, Fig. 1 is a view in side elevation, looking from the right, of the head of the machine embodying the features of the present invention; Fig. 2 is a plan view on an enlarged scale of a portion of the head shown in Fig. 1, parts having been broken away and shown in section; Fig. 3 is a view in front elevation of a portion of the head of the machine; Fig. 4 is a view in rear elevation of the head, parts having been broken away and shown in section; Fig. 5 is a view taken in vertical section along the line 5—5 of Fig. 3; Fig. 6 is a view in vertical section illustrating parts on a somewhat reduced scale within the main frame of the machine; Fig. 7 is a view in vertical section, taken along the line 7—7 of Fig. 3, illustrating parts of the machine with the work in operating position; Fig. 8 is a detailed view, partly in section, taken along the line 8—8 of Fig. 7; Fig. 9 is a view in vertical section, taken along the line 9—9 of Fig. 3; Fig. 10 is a view in front elevation of a portion of the machine illustrating the thread cutter as it acts to sever the threads; Fig. 11 is a view in elevation, and in section, looking towards the right of the machine, with the parts in the positions shown in Fig. 10; Fig. 12 is a view of the front portion of the machine in vertical section, looking from the left, with the parts in similar position; Fig. 13 is a sectional view, looking from the right of the machine showing more particularly the thread case, the thread measuring and thread locking devices; Fig. 14 is a detail view, looking in the direction of the arrow 14 in Fig. 13, of the thread case and shuttle construction; Fig. 15 is a sectional view, taken along the line 15—15 of Fig. 14; Fig. 16 is a detail view, on an enlarged scale, partly in section, of the thread case, taken along the line 16—16 of Fig. 15; Fig. 17 is a view of a portion of the thread case, taken along the line 17—17 of Fig. 15; Fig. 18 is a view on a further enlarged scale of a portion of the shuttle and thread case arrangement, as viewed from the line 18—18 of Fig. 14; Figs. 19 to 22 inclusive are detail views illustrating the operation of the thread measuring and locking devices as the loop of needle thread is being drawn towards the work, pulling the stitch thus formed into the work; Figs. 23 and 24 are detail side sectional views on an enlarged scale, partly in section, illustrating the needle and needle guides of the machine in successive operating positions; Fig. 25 is a view in front elevation and in section of the needle and awl supporting stud; Fig. 26 is an enlarged view of certain parts actuated by the machine in stopping when the machine is being brought to rest; and Fig. 27 is a separated view illustrating the construction and manner of assembling certain of the parts shown in Fig. 26.

The machine illustrated in the drawings is a high speed lockstitch shoe sewing machine, similar in many respects to that disclosed in inventor's U. S. patent above referred to.

Starting and stopping of the machine is effected by a treadle controlled driving and stopping mechanism substantially the same as that disclosed in the present inventor's prior U. S. Letters Patent No. 2,078,942 of May 4, 1937. This mechanism comprises a main high speed driver 2 mounted to rotate upon the main sewing shaft 4 of the machine and to be connected and disconnected with the shaft by means of a clutch 6 actuated by connections to a foot treadle (not shown), which connections include arms 8, secured in angular relation to a shaft 9, a vertical rod 10 pivotally connected with one of the arms 8, an arm 12 connected with the rod 10 and a treadle rod 14 (see Figs. 4 and 5) connected with the arm 12. When the treadle rod is lowered, the main driving clutch connects the high speed driver 2 with the sewing shaft 4 and when the treadle rod is raised the clutch disconnects the driver 2 from the shaft 4. Upon disconnecting the high speed driver from the shaft 4 a low speed driving mechanism including a low speed driver 16 acts to drive the sewing shaft 4 in a reverse direction for a portion of a complete rotation. The means for connecting and disconnecting the low speed driver 16 with the shaft 4 includes a follower lever 18 having its upper end actuated by a cam 20 on the sewing shaft and its lower end formed with a recess for the reception of a lock bolt 22 actuated through a lever 24 mounted at the outer end of a hollow shaft 25, as described more fully in inventor's Patent No. 2,078,942.

The stitch forming and work feeding devices of the machine are best illustrated in Figs. 3 and 7 and include a curved hook needle 26, a curved awl 28, a shuttle or loop taker 30, within a guideway of which is mounted a hollow circular thread case 32 containing a supply of locking thread, a looper 34, a thread hook or finger 36, a take-up 37, a presser-foot 38, and a work support 40. The stitch forming devices of the machine are provided with means for drawing off a measured amount of locking thread from the thread case and a thread lock mounted on the thread case insures that only the amount of locking thread measured will be used in the formation and setting of each stitch. The work is fed continuously by alternate feeding movements of the presser-foot and work support as one unit and of the needle as another unit while engaging the work.

In the machine embodying the present invention an amount of locking thread is not only measured and rendered available for use in each stitch but the measured amount is held yieldingly from movement towards the work so that rigidity is maintained in the length of locking thread between the thread case and the work after the measured amount is rendered available. When the needle loop is being drawn towards the work, it is tightened initially against this rigidly held length of the locking thread at a point where the locking thread is unsupported by the work. The needle loop, still projecting some distance above the work, then slides with certainty along the locking thread to a point a uniform distance from the last stitch before acting to draw the measured amount towards the work. The locking thread, therefore, is not gripped by the receding needle loop against the work until a definite point of engagement between the two threads is reached.

The means for drawing off a measured amount of locking thread from the supply in the thread case comprises a flat elongated thread deflecting rod 42 (Figs. 14 to 18) mounted for movement towards and from the thread case to engage the locking thread between a pair of abutments 44 and 46 on the thread case. The lower end of the deflecting rod is rounded and its side edges are grooved to receive the locking thread as it passes around the lower end. The abutments 44 and 46 are formed at the ends of a slot 48 passing through a curved rib 50 projecting from one side of the thread case and through a flange 52 which serves as a rotary support for the thread case in the loop taker 30. The locking thread extends from a bobbin 54 inside the thread case, through an opening 56 in the side of the thread case, beneath a tension spring 58, across the abutments 44 and 46 and through a spring guide 60 secured to the side of the thread case. When the rod 42 is reciprocated between the abutments 44 and 46 to the position indicated in Fig. 22, sufficient thread is drawn past the tension spring 58 to complete the succeeding stitch. After the deflecting rod is retracted from engagement with the thread, the measured amount of thread is rendered available for use in a stitch.

To hold the measured amount of locking thread yieldingly from movement towards the work after the deflecting rod is retracted, the locking thread as it passes the abutment 44 is gripped between a pair of jaws comprising the rib 50 and a block 62, hereinafter termed the tensioning gripper. The flange 52 is recessed to receive the block 62 and the block is pivoted on a pin 64 and arranged with a cam shaped thread engaging surface close to the rib 50. To hold the block 62 in engagement with the thread, within the recess of the flange 52, there is a spring 66 compressed between the block and the thread case. The block 62 not only holds the locking thread yieldingly after measurement, but prevents displacing the previous stitch while the deflecting rod is moving between the abutments 44 and 46 to measure thread, the cam shaped thread engaging surface of the block being so shaped that movement of the thread towards the work only is permitted.

The thread lock for preventing increase in the measured thread when the stitches are set is in the form of opposed jaws consisting of the rib 50 and a block 68, hereinafter termed the stitch setting gripper, having a cam shaped thread engaging surface rotatably mounted on a pin 70 secured in the thread case. The flange 52 is suitably recessed to receive the block 68 and a spring 72 forces a cam shaped thread engaging surface of the block towards the rib 50. The cam shaped thread engaging surface of the block 68 is so formed as to grip the locking thread with greater pressure when the tension on the thread increases.

To release the thread from the stitch setting gripper 68 while the measured amount of thread is being withdrawn from the thread case, the gripper is provided with a shoulder 74 against which the deflecting rod 42 acts when projected between the abutments 44 and 46. When the deflecting rod is raised, the spring 72 again forces the gripper 68 against the thread and prevents any change in the amount of locking thread withdrawn.

To enable each needle loop to pass freely over the thread case without being caught by the deflecting rod 42, the deflecting rod is retracted to a position clear of the thread case while the needle loop is being engaged by the loop taker. The means for actuating the deflecting rod 42 comprises mechanism for reciprocating the deflecting rod from a position clear of the thread case to a position in which the stitch setting gripper 68 is released from the thread and another mechanism for moving the deflecting rod between the abutments a predetermined distance in order to measure the desired amount of thread. Both of these mechanisms are actuated by cams on the main sewing shaft and are separately adjustable so that the amount of measured thread may be changed without affecting the adjustments of the mechanism for actuating the deflecting rod to release the gripper 68.

The deflecting rod 42, as shown in Figs. 10 and 13 to 15, is mounted for reciprocation in a guideway 76 secured in alinement with the slot 48 in the side of the thread case by means of screws 78 to a stationary part of the frame. At the upper end of the deflecting rod there is threaded a spherically headed pin 80 surrounded by a socket at the upper end of a link 82, the lower end of which is provided with a similar socket for a spherically headed pin 84 secured to the outer end of an arm 86. The arm 86 is loosely mounted on a horizontal rod 88, the extreme end of which is formed with an integral finger portion 90 (Fig. 13) against which the arm 86 is held yieldingly by means of a spring 92 coiled about the rod 88. One end of the spring 92 engages the arm 86 and the other end engages a set screw 94 (Fig. 10) threaded into a collar 96, the set screw 94 acting to hold the collar in place on the rod.

The mechanism for reciprocating the locking thread deflecting rod 42 toward and from the thread case comprises an inverted U-shaped lever 98 having bearings for the rod 88 at the lower ends of its parallel arms. The lever 98 is fulcrumed on a pin 100 passing through a rigid portion of the machine frame and is provided with a rearwardly extending arm pivotally connected with the upper end of a link 102 (see Fig. 9), the lower end of which is pivotally connected to the arm of a cam actuated lever 104 mounted to oscillate on a shaft 106. The motion imparted to the lever 104 is such that the deflecting rod 42 will move out of engagement with the thread case to permit the stitch setting gripper to grip the locking thread in one extreme position and will move into engagement with the thread case to release the grip of the stitch setting gripper 68 on the locking thread in the other extreme position.

The mechanism for causing the thread deflecting rod 42 to measure the proper amount of locking thread for use in a stitch comprises an arm 108 made fast to the left end of the rod 88 to rotate the rod in its bearings in the U-shaped lever 98, thus causing the arm 86 to oscillate about the axis of the rod 88. The upper end of the arm 108 carries a pivot 110, the axis of which before measuring the locking thread is approximately concentric with the axis of the pin 100. When the lever 98 is oscillated about the pin 100, the arm 108, rod 88 and arm 86 move as a unit with the lever 98 causing the deflecting rod to be actuated through a definite distance towards and from the thread case. Connected with the pin 110 in the arm 108 is one end of a horizontal link 112. The other end of this link is connected by means of a pin 114 to a block 118 which is slidably mounted in an arcuate slot 120 in a lever 122. The block 118 is also connected by the pin 114 to the lower end of an L-shaped carrier 116 which is actuated as hereinafter described. The lever 122 is oscillated about a shaft 124 and when the position of the block 118 in the slot 120 is changed, the thread measuring movement imparted to the deflecting rod 42 is adjusted. The curvature of the arcuate slot 120 is such that before the measuring movement of the deflecting rod 42 takes place, the center of this curvature lies substantially at the center of the pivot 110 on which the link 112 is mounted. By this arrangement, the deflecting rod will always be retracted by the thread measuring mechanism uniformly to a predetermined position, regardless of the position of the block 118 in the slot.

To change the position of the block 118 in the slot 120, the upper end of the carrier 116 is secured in a block 126 having lug portions pivotally connected with a lever 128 fulcrumed between its ends on a pin 130 and provided with a rounded portion engaging a horizontal slot in a block 132. Connected with the block 132 is a pin 134 passing loosely through a hollow threaded sleeve 136 and having a nut 137 (see Fig. 4) at its upper end to prevent lengthwise movement of the pin 134 in the sleeve. The sleeve 136 engages a threaded opening in the upper portion of the machine frame and the upper end of the sleeve is provided with a thumb adjusting nut 138, the arrangement being such that by rotating the sleeve the lever 128 may be moved about its fulcrum 130 and the carrier 116 connected with the block 118 may be raised and lowered to adjust the amount of locking thread withdrawn from the thread case.

The operation of the thread deflecting rod 42 and the grippers 62 and 68 will be clearly understood from an inspection of Figs. 19 to 22 inclusive which illustrate the different positions of the locking thread, indicated at 140, and the needle thread, indicated at 142, as the loop of needle thread is being drawn from the shuttle and pulled into the work. Just before the position of the threads illustrated in Fig. 19 is reached, the deflecting rod 42 moves between the abutments 44 and 46, drawing from the thread case the proper length of thread to complete a stitch. When the deflecting rod is retracted from the thread case the gripper 68 engages the locking thread and prevents change in the amount of thread measured. The needle loop is then disengaged from the shuttle, having passed over the thread case and tends to whip rapidly without any regular shape as it is drawn loosely around the locking thread. When the position of Fig. 19 is reached, the needle loop ceases its irregular whipping movements and is pulled tightly about the rigidly held and laterally unsupported length of locking thread 140 which extends between the thread case and the work. The needle loop in being drawn more tightly, slides along the locking thread towards the previous stitch until such a point is reached that the pull on the locking thread is sufficient to draw the locking thread towards the work against the yielding tension exerted by the gripper 62. The locking thread is still free to slide through the needle loop until the position of Fig. 20 is reached, where the locking thread between the last stitch and the thread case is brought into lateral engagement with the work. During the movement of the locking thread from the position of Fig. 19 towards the work to the position of Fig. 20, a further slight adjustment of the point of engagement of the threads may take place, the locking thread tending to slide through the needle loop until the distance between the point of engagement is substantially equal to the distance between stitches. As the needle loop continues to be drawn through the work, it draws the remainder of the measured amount of locking thread from between the abutments 44 and 46 and acts to set the stitch, as illustrated in Fig. 21. When the locking thread is pulled tight between the abutments 44 and 46, the gripper 68 prevents further movement of the locking thread and the stitch is set.

After each stitch is set, the deflecting rod 42 again enters the slot 48 in the thread case releasing the gripper 68 from the thread and withdrawing a measured amount of locking thread preparatory to the formation of the succeeding stitch, as shown in Fig. 22. At the same time the needle engages the work in order to receive the needle thread and draw through the work for the succeeding stitch, the operations being repeated in regular order.

When the machine is at rest, it is sometimes desirable to pull off an extra supply of thread by hand as when the wax on the thread extending from the thread case has cooled and hardened rendering it unfit for use. To release the locking thread from the stitch setting gripper 68 on the thread case, the mechanism for reciprocating the deflecting rod 42 towards and from the thread case is so arranged with relation to the stopping position of the machine that the deflecting rod will hold the setting gripper open, as indicated in Fig. 13.

The main take-up 37 is secured to an oscillating shaft 144 (see Figs. 3 and 7) rotatable in bearings arranged in the machine frame parallel to the main sewing shaft. The take-up is oscillated through a uniform stroke during each sewing cycle to set each stitch and after a stitch setting strain is applied to the needle thread the take-up draws the required amount of thread from the tension wheel, indicated at 146. It is to be noted that the tension wheel in the present machine (see Figs. 3 and 7) is rotatably mounted on a stud arranged at right angles to the take-up shaft 144 and that the periphery of the tension wheel, at the point where the thread leaves the wheel, is substantially in the plane in which the take-up pulley 148 oscillates, and is located between the take-up shaft and the take-up pulley. From the tension wheel the thread passes over a single intermediate pulley 150 only (see Fig. 8) above the take-up shaft. This arrangement of the take-up and tension wheel also renders them easily accessible for threading.

The thread leaving the take-up extends in a substantially straight line to the looper 34 and is engaged between the looper and the take-up by a frictional tension device comprising a plate 152 mounted to press yieldingly against the thread and arranged with its thread engaging surface in the plane through which the take-up pulley 148 moves. The plate 152 is secured to a pin 154 slidably mounted for movement towards and from the thread and the ends of the plate are engaged by coil springs 156 mounted in recesses 158 in the frame. The springs 156 compress the plate 152 against the needle thread, gripping it frictionally between the plate and a cover 160 having a thread engaging surface 162 parallel to the opposing surface of the plate 152.

To release the frictional tension produced by the plate 152, on the needle thread as the threaded needle passes through the work, the pin 154 is slotted at its outer end and is engaged by the beveled end of a sliding rod 164 mounted in lugs formed on the frame of the machine. The other end of the rod 164 acts against a cam 166 secured to the take-up shaft 144. To hold the rod against the cam, the rod carries near its beveled end, a coil spring 167 compressed between one of the bearing lugs on the frame and a collar 168 secured to the rod. To prevent the rod 164 from turning, one edge of the collar 168 is flattened to engage the frame portion of the machine. The shape of the cam 166 is such that during the time when the take-up is at the lowermost part of its stroke, while he needle is being looped, the plate 152 is pressed against the thread and at other parts of the take-up stroke the plate is disengaged from the thread.

To shield the take-up and tension wheel, the cover 160 is formed with portions disposed at right angles to each other, one of which surrounds one side of the take-up and the other of which encloses the tension wheel. At the other side of the take-up is a stationary guard 170 and the cover is hinged to swing in a plane parallel with the oscillating movement of the take-up about a pivot 172 parallel to the take-up shaft so that the meeting edges of the guard and cover will slide along each other. The portion of the cover enclosing the tension wheel 146 is provided with an opening through which the adjusting nut for the tension wheel projects.

To prevent the cover 160 from displacing the needle thread when swinging the cover about the pin 172, the driving and stopping mechanism of the machine is arranged to bring the machine to rest with the take-up 37 in a position near the lowermost part of its stroke. The beveled end of the rod 164 is then held against the pin 154 and the plate 152 is retracted from the thread.

The presser foot 38 is fulcrumed on a horizontal shaft 174 (see Fig. 11) in the frame of the machine and is intermittently locked against the work by mechanism of the same construction as that in the machine of inventor's Patent No. 2,148,197 of February 21, 1939. The lock for the presser foot comprises a pair of locking wedge blocks 176 and 178, the lower one of which is connected to the presser foot by a link 179 and the upper one of which has a rod portion connected by a pair of links 180 to a lifting lever 182 fulcrumed on a horizontal shaft 183. To move the presser-foot against the work, the lever 182 is connected to one end of a tension spring 184, the other end of which is secured to the machine frame. The arrangement is such that the presser-foot may be moved towards the work support by the spring 184 but the presser-foot is locked from movement away from the work until the wedge block 178 is actuated by connections to the sewing shaft described more fully in inventor's Patent No. 2,148,197.

The illustrated machine is provided with power driven auxiliary mechanism for performing certain final operations at the end of a seam, such as severing the threads and raising the presser foot. To sever the threads there is a thread cutter in the form of a curved knife edged member 186 of angular cross section arranged to move toward and from the work, and to sever both threads beneath the surface of the work, which cutter, except as hereinafter pointed out, is of substantially the construction and mode of operation as disclosed in inventor's Patent No. 2,148,197. To change the path of movement of the knife in the machine of that patent, when the thickness of the work varies the mechanism for actuating the knife is adjusted by the position of presser foot of the machine. The knife actuating mechanism is connected to a feeler which is set by yielding engagement with the presser foot before the threads are severed. With this construction, when the knife mechanism is actuated rapidly, it sometimes happens that the feeler engages the presser-foot with such an impact that the work is indented or marked in an undesirable manner by the blow of the feeler on the presser-foot.

In order to avoid marking the work by the presser-foot, in the present machine when the thread cutter adjusting feeler is set, the feeler, indicated at 188 in Figs. 11 and 12, is in the form of a link having a lost motion connection with the presser-foot and is moved in a direction tending to decrease the pressure of the presser-foot on the work while being set. The feeler link 188 is raised to adjust the thread cutter mechanism and is provided with an elongated slot formed at its lower end through which passes a pin 189 connecting the link 179 with the presser-foot, the presser-foot 38 being held by the inter-action of the locking wedge blocks 176 and 178, against the force of the link while the thread cutter acts. With this construction, the impact of the feeler link 188 is entirely absorbed by the locking blocks without disturbing the position of the presser-foot on the work.

The thread cutter of the present machine, like the thread cutter of Patent No. 2,148,197, is moved through a helical path by its actuating mechanism, the central axis of which path is at right angles with the surface of the work and substantially parallel to the length of locking thread extending between the thread case and the work. The cutter knife member 186 is secured in a holder at the lower end of a vertical shaft 190 mounted for reciprocating and rotary movement in bearings on the machine frame. To rotate the cutter shaft 190, it is connected to be operated by the auxiliary mechanism comprising the squared upper end of the shaft 190, a gear segment 192 (see Fig. 2) having a squared hole for receiving the upper end of the shaft and meshing with a corresponding segment 194 formed on one arm of a lever 196. The lever 196 is fulcrumed on a vertical stud 198 and is provided with a gear segment 200 meshing with teeth on a rack bar 202 slidably mounted in a horizontal bearing in the frame. The rearward end of the rack bar 202 is connected by means of a link 204 with a lever 206 pivotally mounted at its lower end on a stud screw 208 (see Fig. 6) and provided with a cam roll 210 engaging a slot in a cam 212. The cam 212 is mounted on an auxiliary shaft 214 at the rear of the machine and is arranged to be rotated one complete revolution at the end of a seam.

The cutter shaft rotating mechanism is also connected to reciprocate the shaft at the same time that it is rotated, thus imparting the helical movement to the cutter knife. In the machine of the Patent No. 2,148,197, the point of intersection with the threads is changed in a direction towards and from the work support by providing more or less lost motion between the shaft rotating mechanism and the reciprocating connections. When operating at high speeds, the lost motion of these connections is a source of excessive impact and vibration which tends to produce irregular results. In the present machine such lost motion between the cutter shaft rotating mechanism and the connections for reciprocating the shaft is avoided.

To change the length of reciprocating movement of the cutter shaft 190 in the machine illustrated, the relative rate of reciprocating movement of the cutter shaft lengthwise of the locking thread is increased or decreased so as to cause the intersection with the threads at the required point. For reciprocating the shaft there is pinned to an intermediate part of the shaft a collar 215 (Figs. 9, 11 and 12) surrounding which is loosely mounted a perforated yoke 216. At one side of the yoke is a hole threaded to receive a screw 217 passing through the lower end of a link 218. The upper end of link 218 is pivotally connected with a bolt 219 passing through a block 220 engaging an arcuate slot 221 in an arm 222. The arm 222 is secured to the right end of a shaft 224 rotatable in bearings in the machine frame. The left end of the shaft 224 carries an arm 226 connected by means of a link 228 with the forward end of the link 204 of the cutter shaft rotating mechanism. By shifting the position of the block 220 in the slot 221 of arm 222 the effective length of this arm in reciprocating the shaft is changed. The curvature of the slot 221 is such that when the cutter shaft is raised (Fig. 6) the center of its curvature will be concentric with the screw 217, thus insuring that the cutter shaft 190 will always be raised to the same position.

To shift the block 220 in the slot 221 of arm 222, the bolt 219 is connected by a link 229 with an arm 230 clamped to the right end of a horizontal shaft 232, rotatable in suitable bearings in the machine frame. The left end of the shaft 232 carries a lever 234 on one arm of which the feeler link 188 is pivotally mounted. When the link 188 is raised into cooperative relation with the presser-foot, the shaft 232 is rocked in a direction tending to move the block 220 towards the rear of the machine (Fig. 11), thus decreasing the length of reciprocating movement imparted to the cutter shaft 190 by the amount required for the thickness of the work.

To raise the feeler link 188 to the limit of its upward movement until stopped by the presser-foot, the shaft 232 is surrounded by a spring 236, (see Figs. 2, 11 and 12), one end of which bears on the frame of the machine, and the other end of which bears on a screw 238 forming a pivotal connection between the link 229 and the arm 230. To prevent the spring 236 from raising the feeler link 188 while the machine is running, one arm of the lever 234 is formed with a lug 240 arranged to be engaged by a latch 242 secured to one end of a pin 244 rotatably mounted in the machine. The pin 244 is formed with an enlarged head provided with a shoulder 246 cooperating with a detent at the end of a spring pressed plunger 248 mounted in the arm 222 of the cutter shaft reciprocating mechanism. The latch 242 is normally held in a position where it will prevent rotation of the lever 234 by a spring 250 wound about the pin 244 having a rearwardly extending end resting on the machine frame. The other end of the spring 250 engages an opening in the head of the pin 244. When the arm 222 moves downwardly as the cutter begins to operate, the detent 248 engages the shoulder 246 (Fig. 6) and swings the latch 242 out of engagement with the lug 240. The feeler link 188 then is raised until stopped by the pin 189 on the presser-foot.

To reset the feeler link, the lever 234 carries a headed screw 251 passing through a slot in the enlarged forward end of a horizontal link 252, the rearward end of which is pivotally connected to the vertical arm of a lever 254 (see Fig. 11) on the shaft 183, by a pin 256. The pin 256 also forms a connection with a link 258 and a lever 260 (see Fig. 6) at the rear of the machine actuated by a slot in the cam 212. After the thread cutter has operated and the cutter shaft 190 has been raised to its highest position, the lever 260 operates through the connections just described to move the feeler link 188 downwardly to a position where it is held by the latch 242. The lever 254 is also provided with a horizontal arm which, when the cam 212 is rotated, engages a set screw 262 on the presser-foot lock lifting lever 182 so as to raise the presser-foot from engagement with the work after the threads have been severed.

The shaft 214 on which the cam 212 is mounted supports a one-revolution clutch having a driving part 264, best shown in Figs. 2 and 4, and relatively movable driven parts 266, 268, of the same construction and mode of operation as described more particularly in inventor's Patent No. 2,078,942. The driven parts 266 and 268 of the clutch are held from rotation with the driving part 264 by a pawl 270 (see Figs. 5, 26 and 27), and a hook shaped arm 272 loosely mounted on a supporting shaft 274 at one side of the sewing shaft near the upper part of the machine. The pawl 270 is yieldingly held in the path of an abutment 276 on the clutch part 266 and during the latter part of the reverse rotation of the main sewing shaft at the end of the seam, the pawl is released from the abutment to throw the clutch into action.

In the machine of inventor's Patent No. 2,078,942, the pawl 270 is released from the abutment 276 of the one-revolution clutch by engagement with a latch mounted on a three-armed lever on the shaft 274 corresponding to a lever 278 of the present machine. As in the machine of said patent, the lever 278 of the present machine is secured to the shaft by a set screw 279 and carries a roll 280 engaging a cam disk 282 on the main sewing shaft. One arm of the lever 278 is connected to the treadle rod 14 by connections including a link 284 (see Fig. 6), and an arm 286 secured to the shaft 25. When the treadle rod is released, the roll 280 is moved against the cam disk 282 by a spring 288 surrounding the central part of the shaft 274, best shown in Figs. 2, 4 and 9. The cam disk 282 is provided with a slot 290 into which the roll 280 enters when the sewing shaft reaches a stopping position, the latch on the stop lever 278 of the machine in the Patent No. 2,078,942 being held from engagement with the clutch actuating pawl 270 when the roll 280 rides along the outer surface of cam disk 282.

Under certain conditions, with the parts constructed and arranged as in the machine of said patent last referred to, the roll 280 may enter the slot 290 of the cam disk during forward rotation of the sewing shaft before it is reversely rotated, and in this way the auxiliary clutch of the prior machine may be operated at an improper time. Thus, if the stop lever 278 of the machine described in said patent happens to be released by the movement of the stopping treadle just at the moment when the slot in the cam disk 282 is opposite the roll 280 of the stop lever 278, a sufficient movement of the roll 280 into the slot 290 of the cam disk may be permitted to trip the auxiliary clutch into operation during the continued forward rotation of the shaft.

To prevent improper operation of the auxiliary clutch in the present machine, the latch for releasing the clutch pawl 270 is mounted on a separate control member operated only during reverse rotation of the sewing shaft. The control member consists of a dog 292 having two triangular shaped arms, which dog in the prior machine is connected to actuate a brake band 294 during final reverse rotation of the sewing shaft. The control dog 292 is loosely mounted on the hub of the lever 278 to rock about the shaft 274 as a center, and is provided with a third arm supporting a bolt 296 on which is fulcrumed the clutch actuating latch in the form of a lever 298. The dog 292 is held yieldingly in definite relation to the lever 278 by a spring 300 coiled around the hubs of the lever and dog and by a set screw 302 on the dog engaging an arm of the lever 278, the arrangement being such that the dog may be rocked by the lever 278 into the path of an abutment or roll 303 carried by the cam disk 282. The roll 303 is mounted in a slot 304 in the cam disk 282 and when the dog 292 is moved towards the path of the roll 303 during forward rotation of the sewing shaft, it engages the surface of the cam disk without causing the clutch pawl to be released.

To release the clutch pawl 270 during reverse rotation of the sewing shaft, the dog 292 is first rocked to a set position by movement of the lever 278 when the roll 280 enters slot 290 of the cam disk. One of the arms of the dog then enters the slot 304 in the cam disk where it is engaged by the abutment roll 303. Continued reverse rotation of the sewing shaft rocks the dog a sufficient amount to cause the latch lever 298 to release the pawl 270. To prevent the pawl from being held in released position for more than one rotation of the auxiliary clutch, the latch lever 298 is held yieldingly by a spring 305 surrounding the hub of the latch lever so as to engage a shoulder 306 on the clutch pawl 270 and before a single rotation of the cam 212 is completed a pin 308 on the cam actuated lever 260 engages an arm of the latch lever 298 to shift it beyond the shoulder 306, thus permitting the pawl to again engage the abutment 276 on the clutch, as shown in Fig. 26.

To enable the needle 26 to penetrate through a relatively small awl perforation in the work and be retracted with a heavy thread without bending or breaking, there is mounted on the needle supporting stud, indicated at 310 in Figs. 23 to 25, a pair of needle guides 312 and 314, movable relatively to each other along the needle as the needle enters or retracts from the work. The needle is mounted in a segment 316 on the needle stud 310 and a reduced portion of the hub of the needle segment provides a bearing for the needle guide 312, engaging the needle at an intermediate point along the length of the needle. The hub of the needle guide 312 is provided with an outer bearing surface on which the needle guide 314 is mounted and arranged to engage the needle near its hooked end. When the needle enters the work the needle guide 314 moves with the needle until stopped by the presser-foot 38, the needle continuing through the work.

To move the needle guide 314 with the needle, the guide is provided with a yieldingly actuated friction shoe 318 engaging a concentric surface on the needle segment 316 and an arm 320 having a lug adapted to cooperate with an abutment shoulder 322 on the needle segment. In order to hold the needle guide from movement until the needle is clear of the work, the arm 320 is engaged by an enlargement 324 on the thread finger 36. After the needle loop has been removed from the needle, the thread finger imparts a further movement to the needle guide 314, to cause it to cover the empty hook of the needle, the arm 320 engaging shoulder 322 and preventing movement of the guide beyond the end of the needle as described more fully in inventor's U. S. Patent No. 2,038,282 of April 21, 1936.

To separate the needle guides 312 and 314 and hold them in spaced relation along the needle, the intermediate guide 312 is formed with a bore 326 to receive a compression spring 328 acting between the end of the bore 326 and a pin 330 on the needle guide 314. To limit the movement of the guides away from each other the intermediate guide 312 is formed with a projection 332 cooperating with a portion of the guide 314. When the needle is moved towards the work the hook covering guide 314 engages the presser-foot, holding the guide 314 stationary as the needle enters the work. Both guides then remain stationary until the needle segment engages the intermediate guide 312. The spring 328 is then compressed and the intermediate guide is moved towards the hook covering guide 314 to the position shown in Fig. 24 until the needle reaches the limit of its penetrating stroke. When the needle is retracted from the work reverse movements take place, the intermediate guide moving with the needle segment until the projection 332 engages the guide 314. The guide 314 then moves with the guide 312 and the friction of the shoe 318 on the needle segment is sufficient to carry the guides with the needle until the guide 314 is engaged by the thread finger. The two guides are then moved further towards the hooked end of the needle until the guide 314 is actuated to cover the empty needle hook, as previously described.

Certain features of the machine herein disclosed, but not claimed relating particularly to thread cutting devices, driving and stopping mechanisms, thread tension, and needle guide devices form the subject-matter of divisional applications Serial No. 293,790 filed September 7, 1939; Serial No. 297,911 filed October 4, 1939; Serial No. 297,912 filed October 4, 1939; and Ser. No. 300,444 filed October 20, 1939 respectively.

The nature and scope of the invention having been indicated, and a construction embodying the several features of the invention having been specifically described, what is claimed is:

1. A lockstitch sewing machine having, in combination, a hook needle, a thread case containing a supply of locking thread, a loop taker for passing a loop of needle thread about the thread case, a take-up for drawing each needle loop from the thread case towards the work, and means for drawing off a measured amount of locking thread from the supply and for holding the measured amount yieldingly against movement towards the work to cause the needle loop to be tightened against a laterally unsupported portion of the locking thread.

2. A lockstitch sewing machine having, in combination, a hook needle, a thread case containing a supply of locking thread, a loop taker for passing a loop of needle thread about the thread case, a take-up for drawing each needle loop from the thread case towards the work, means for drawing off from the supply an amount of locking thread sufficient to enter a predetermined distance beneath the surface of the work when pulled in by the needle loop, and a yielding member on the thread case engaging the locking thread to cause the needle loop, while being drawn towards the work, to be tightened against the locking thread before the portion of the locking thread between the thread case and the previous stitch engages the work.

3. A lockstitch sewing machine having, in combination, a hook needle, a thread case containing a supply of locking thread, a loop taker for passing a loop of needle thread about the thread case, a take-up for drawing each needle loop from the thread case towards the work, deflecting means acting across the path of the locking thread to draw off from the supply a measured amount for the next stitch, mechanism for retracting the deflecting means from the locking thread to render the amount of locking thread drawn off from the supply available for use in a stitch, and a member yieldingly mounted on the thread case acting to cause the needle loop, while being drawn towards the work, to be tightened against a laterally unsupported portion of the locking thread after the thread deflecting means is retracted.

4. A lockstitch sewing machine having, in combination, a hook needle, a thread case containing a supply of locking thread, a loop taker for passing a loop of needle thread about the thread case, a take-up for drawing each needle loop from the thread case towards the work, an abutment on the thread case past which the locking thread passes, deflecting means acting across the path taken by the locking thread adjacent the abutment to draw off from the supply a measured amount for the next stitch, mechanism for retracting the deflecting means from the locking thread to render the amount drawn from the supply available for use in a stitch, and a yielding member for pressing the thread against the abutment to apply a tension to the locking thread after the thread deflecting means is retracted.

5. A lockstitch sewing machine having, in combination, a hook needle, a thread case containing a supply of locking thread, a loop taker for passing a loop of needle thread about the thread case, a take-up for drawing each needle loop from the thread case towards the work, gripper jaws on the thread case between which the locking thread passes, deflecting means acting across the path of the locking thread between the gripper jaws and the supply to draw off from the supply a measured amount for the next stitch, and yielding means for closing the gripper jaws on the thread to apply a tension to the locking thread as the needle loop draws the locking thread towards the work.

6. A lockstitch sewing machine having, in combination, a hook needle, a thread case containing a supply of locking thread, a loop taker for passing a loop of needle thread about the thread case, a take-up for drawing each needle loop from the thread case towards the work, deflecting means acting across the path of the locking thread to draw off from the supply a measured amount for the next stitch, and thread gripping means comprising cooperating jaws on the thread case, one of which is yieldingly mounted to apply a tension to the locking thread as the needle loop draws the locking thread towards the work and to prevent movement of the locking thread in the reverse direction as the measured amount is being drawn from the supply.

7. A lockstitch sewing machine having, in combination, a hook needle, a thread case containing a supply of locking thread, a loop taker for passing a loop of needle thread about the thread case, a take-up for drawing each needle loop from the thread case towards the work, a deflecting rod mounted for movement across the path of the locking thread at one side of the thread case to draw off from the supply a measured amount of locking thread for the next stitch, locking thread engaging means including two pairs of gripper jaws on the thread case arranged when gripping the thread to prevent movement of the thread towards the point where the deflecting rod acts, and yielding means for actuating one of said pairs of gripper jaws to impart a tension to the thread when drawn from between said pairs of gripper jaws towards the work.

8. A lockstitch sewing machine having, in combination, a work piercing needle, a thread case containing a supply of locking thread, a loop taker for passing a loop of needle thread about the thread case, thread deflecting means acting across the path of the locking thread to draw off from the supply an amount for each stitch, and means for gripping the locking thread between the deflecting means and the work to prevent the previously formed stitch from being displaced as the deflecting means acts.

9. A lockstitch sewing machine having, in combination, a hook needle, a thread case containing a supply of locking thread, a loop taker for passing a loop of needle thread about the thread case, a take-up for drawing each needle loop from the thread case towards the work, a thread deflecting rod mounted for movement across the path of the locking thread at one side of the thread case to draw off from the supply a measured amount for the next stitch, and locking thread engaging means including yieldingly actuated jaws on the thread case arranged to prevent movement of the locking thread towards the point where the deflecting rod acts, one of said jaws between the deflecting rod and the supply being actuated to release the locking thread by engagement with the deflecting rod.

10. A lockstitch sewing machine having, in combination, a work piercing needle, a thread case containing a supply of locking thread, a loop taker for passing a loop of needle thread about the thread case, gripper jaws mounted on the thread case between which the locking thread passes towards the work, yielding means acting to hold the jaws together, and a thread deflecting rod arranged for movement towards and from the thread case to separate the jaws and to draw off locking thread from the supply between said jaws.

11. A lockstitch sewing machine having, in combination, a work piercing needle, a thread case containing a supply of locking thread, a loop taker for passing a loop of needle thread about the thread case, thread deflecting means cooperating with the thread case to draw off locking thread in an amount sufficient for each stitch, gripper jaws acting on the locking thread between the work and the deflecting means to prevent the tension on the locking thread from affecting the last formed stitch during operation of the deflecting means, and gripper jaws acting on the locking thread between the deflecting means and the supply arranged to be opened before the thread is drawn off and to grip the thread before each stitch is set.

12. A lockstitch sewing machine having, in combination, a main sewing shaft, a work piercing needle, a thread case containing a supply of locking thread, a loop taker for passing a loop of needle thread about the thread case, a thread deflecting rod cooperating with the thread case to draw off a measured amount of locking thread from the supply for each stitch, and mechanism for actuating the deflecting rod comprising separate trains of connections operated by the sewing shaft, one of said trains being arranged to actuate the deflecting rod towards and from cooperative relation with the thread case, and the other train being arranged to impart the thread drawing movement to the deflecting rod.

13. A lockstitch sewing machine having, in combination, a main sewing shaft, a work piercing needle, a thread case containing a supply of locking thread, a loop taker for passing a loop of needle thread about the thread case, a thread deflecting rod cooperating with the thread case to draw off a measured amount of locking thread from the supply for each stitch, mechanism for actuating the deflecting rod comprising separate trains of connections operated by the sewing shaft, one of said trains being arranged to actuate the deflecting rod towards and from cooperative relation with the thread case and the other train being arranged to impart the thread drawing movement to the deflecting rod, and means for adjusting one of the trains of connections to change the length of thread drawn off while the movements imparted to the deflecting rod by the other train of connections remains the same.

14. A lockstitch sewing machine having, in combination, a main sewing shaft, a work piercing needle, a thread case containing a supply of locking thread, a loop taker for passing a loop of needle thread about the thread case, a thread deflecting rod cooperating with the thread case to draw off a measured amount of locking thread from the supply for each stitch, connections operated by the sewing shaft to actuate the deflecting rod towards and from the thread case and to cause the deflecting rod to draw off thread with separate movements, and adjusting means for regulating the amount of the thread drawn off without changing the movements of the deflecting rod towards and from the thread case.

15. A lockstitch sewing machine having, in combination, a main sewing shaft, a work piercing needle, a thread case containing a supply of locking thread, a loop taker for passing a loop of needle thread about the thread case, a thread deflecting rod cooperating with the thread case to draw off a measured amount of locking thread from the supply for each stitch, thread gripping means on the thread case arranged to be operated by the thread deflecting rod, and actuating mechanism comprising separate trains of connections, one of which causes said rod to release the gripping means, and the other of which causes the rod to draw off thread from the thread case.

16. A lockstitch sewing machine having, in combination, a main sewing shaft, a work piercing needle, a thread case containing a supply of locking thread, a loop taker for passing a loop of needle thread about the thread case, a thread deflecting rod cooperating with the thread case to draw off a measured amount of locking thread from the supply for each stitch, thread gripping means on the thread case arranged to be operated by the thread deflecting rod, mechanism for actuating the deflecting rod towards and from the thread case to release the gripping means and to draw off thread, and adjusting means for changing the length of the thread drawn off without changing the movements of the rod towards the thread case to release the gripping means.

OTTO R. HAAS.